US012423972B2

(12) United States Patent
Little et al.

(10) Patent No.: US 12,423,972 B2
(45) Date of Patent: Sep. 23, 2025

(54) INSURANCE INVENTORY AND CLAIM GENERATION

(71) Applicant: State Farm Mutual Automobile Insurance Company, Bloomington, IL (US)

(72) Inventors: Rebecca A. Little, Mesa, AZ (US); Christopher Robert Galante, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/815,481

(22) Filed: Jul. 27, 2022

(65) Prior Publication Data

US 2022/0366689 A1 Nov. 17, 2022

Related U.S. Application Data

(63) Continuation of application No. 16/890,865, filed on Jun. 2, 2020, now Pat. No. 11,436,828.

(51) Int. Cl.
*G06V 20/20* (2022.01)
*G02B 27/00* (2006.01)
(Continued)

(52) U.S. Cl.
CPC ......... *G06V 20/20* (2022.01); *G02B 27/0093* (2013.01); *G02B 27/0172* (2013.01);
(Continued)

(58) Field of Classification Search
CPC .... G06V 20/20; G06V 20/64; G02B 27/0093; G02B 27/0172; G02B 2027/0141;
(Continued)

(56) References Cited

U.S. PATENT DOCUMENTS 8,624,924 B2 1/2014 Dobbins et al.
9,057,746 B1 6/2015 Houlette et al.
(Continued)

FOREIGN PATENT DOCUMENTS

CN 111626536 9/2020
CN 113138558 7/2021
(Continued)

OTHER PUBLICATIONS

Friedman, E. (Feb. 2019). Using AR/VR for assurance in insurance. BrainXChange. Retrieved from https://brainxchange.com/using-ar-vr-for-assurance-in-insurance/, 6 pages.
(Continued)

*Primary Examiner* — Sarah Lhymn
(74) *Attorney, Agent, or Firm* — Lee & Hayes, P.C.

(57) ABSTRACT

Techniques include receiving image data representing an environment. Based at least in part on the image data, an identity of at least one object disposed within the environment is determined. Based at least in part on the image data, an image is displayed on an electronic device. The image includes a three-dimensional representation of at least a portion of the environment, a three-dimensional representation of the at least one object, and a three-dimensional representation of an assistant providing a request related to the at least one object. A first input is received from a user of the electronic device and based at least in part on the request. An object list is generated based at least in part on the first input and the identity of the at least one object, the list including the at least one object.

20 Claims, 21 Drawing Sheets

(51) Int. Cl.
*G02B 27/01* (2006.01)
*G06F 3/01* (2006.01)
*G06Q 40/08* (2012.01)

(52) U.S. Cl.
CPC .............. *G06F 3/013* (2013.01); *G06F 3/017* (2013.01); *G06Q 40/08* (2013.01)

(58) Field of Classification Search
CPC ....... G02B 27/017; G06F 3/013; G06F 3/017; G06F 3/011; G06Q 40/08
See application file for complete search history.

(56) References Cited

U.S. PATENT DOCUMENTS

| | | |
|---|---|---|
| 9,122,321 B2 | 9/2015 | Perez et al. |
| 9,152,737 B1 | 10/2015 | Micali et al. |
| 9,262,789 B1 | 2/2016 | Tofte |
| 9,342,610 B2 | 5/2016 | Liu et al. |
| 9,443,195 B2 | 9/2016 | Micali et al. |
| 9,609,003 B1 | 3/2017 | Chmielewski et al. |
| 9,691,189 B1 | 6/2017 | Creath |
| 9,699,529 B1 | 7/2017 | Petri et al. |
| 9,739,813 B2 | 8/2017 | Houlette et al. |
| 9,798,979 B2 | 10/2017 | Fadell et al. |
| 9,800,958 B1 | 10/2017 | Petri et al. |
| 9,846,915 B2 | 12/2017 | Howe et al. |
| 9,886,953 B2 | 2/2018 | Lemay et al. |
| 9,942,630 B1 | 4/2018 | Petri et al. |
| 10,032,225 B1 | 7/2018 | Fox et al. |
| 10,102,584 B1 | 10/2018 | Devereaux et al. |
| 10,137,984 B1 | 11/2018 | Flick |
| 10,142,394 B2 | 11/2018 | Chmielewski et al. |
| 10,198,771 B1 | 2/2019 | Madigan et al. |
| 10,296,978 B1 | 5/2019 | Corder et al. |
| 10,311,302 B2 | 6/2019 | Kottenstette et al. |
| 10,332,059 B2 | 6/2019 | Matsuoka |
| 10,366,288 B1 | 7/2019 | Kottenstette et al. |
| 10,469,282 B1 | 11/2019 | Konrardy et al. |
| 10,586,177 B1 | 3/2020 | Choueiter et al. |
| 10,643,072 B2 | 5/2020 | Kottenstette et al. |
| 10,664,922 B1 | 5/2020 | Madigan et al. |
| 10,699,346 B1 | 6/2020 | Corder et al. |
| 10,699,348 B1 | 6/2020 | Devereaux et al. |
| 10,719,966 B1 | 7/2020 | Davis et al. |
| 10,735,829 B2 | 8/2020 | Petri et al. |
| 10,740,691 B2 | 8/2020 | Choueiter et al. |
| 10,748,216 B2 | 8/2020 | Smith, Jr. |
| 10,750,252 B2 | 8/2020 | Petri et al. |
| 10,776,883 B2 | 9/2020 | Labrie et al. |
| 10,796,557 B2 | 10/2020 | Sundermeyer et al. |
| 10,802,477 B1 | 10/2020 | Konrardy et al. |
| 10,803,532 B1 | 10/2020 | Brandmaier et al. |
| 10,804,700 B2 | 10/2020 | Cohen et al. |
| 10,818,105 B1 | 10/2020 | Konrardy et al. |
| 10,907,844 B2 | 2/2021 | Ribbich et al. |
| 11,003,334 B1 | 5/2021 | Conway et al. |
| 11,010,129 B1 | 5/2021 | Rakshit |
| 11,023,961 B1 | 6/2021 | Gore et al. |
| 11,087,550 B2 | 8/2021 | Lyren |
| 11,100,594 B1 | 8/2021 | West et al. |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,314,214 B2 | 4/2022 | Rexach et al. |
| 11,348,193 B1 | 5/2022 | Konrardy et al. |
| 11,361,428 B1 | 6/2022 | Chen et al. |
| 11,367,265 B2 | 6/2022 | Vianello et al. |
| 11,398,042 B2 | 7/2022 | Zhao |
| 11,417,212 B1 | 8/2022 | Farooqui et al. |
| 11,475,626 B2 | 10/2022 | Holzer et al. |
| 11,882,303 B2 | 1/2024 | Hur |
| 2003/0046689 A1 | 3/2003 | Gaos |
| 2009/0213114 A1 | 8/2009 | Dobbins et al. |
| 2009/0265193 A1 | 10/2009 | Collins et al. |
| 2009/0326989 A1 | 12/2009 | Schmitt et al. |
| 2012/0154557 A1 | 6/2012 | Perez et al. |
| 2013/0050258 A1 | 2/2013 | Liu et al. |
| 2014/0052480 A1 | 2/2014 | Bell et al. |
| 2014/0266669 A1 | 9/2014 | Fadell et al. |
| 2015/0061859 A1 | 3/2015 | Matsuoka et al. |
| 2015/0301596 A1 | 10/2015 | Qian et al. |
| 2015/0317739 A1 | 11/2015 | Lawlor |
| 2015/0347910 A1 | 12/2015 | Fadell et al. |
| 2016/0110816 A1 | 4/2016 | Cardin |
| 2018/0047395 A1 | 2/2018 | Sommers et al. |
| 2018/0256962 A1 | 9/2018 | Kudirka |
| 2018/0260793 A1 | 9/2018 | Li et al. |
| 2018/0356523 A1 | 12/2018 | England et al. |
| 2019/0050133 A1 | 2/2019 | Grossman |
| 2019/0139317 A1 | 5/2019 | Bilbrey et al. |
| 2019/0188788 A1 * | 6/2019 | Baker, IV ............. G06T 19/006 |
| 2019/0251520 A1 | 8/2019 | Bentley et al. |
| 2020/0076947 A1 | 3/2020 | Deole |
| 2020/0111264 A1 | 4/2020 | Kuruvilla et al. |
| 2020/0219198 A1 | 7/2020 | Pearce |
| 2021/0035153 A1 | 2/2021 | Cohen et al. |
| 2021/0279811 A1 | 9/2021 | Waltman et al. |
| 2021/0312789 A1 | 10/2021 | Linn |
| 2021/0358188 A1 | 11/2021 | Lebaredian |
| 2022/0075504 A1 | 3/2022 | Little et al. |
| 2022/0101275 A1 | 3/2022 | Aspro et al. |
| 2025/0069391 A1 | 2/2025 | Little |

FOREIGN PATENT DOCUMENTS

| | | | |
|---|---|---|---|
| JP | 2003157357 | 5/2003 | |
| KR | 20150129845 | 11/2015 | |
| WO | WO2014159131 | 10/2014 | |
| WO | 2015192117 A1 * | 12/2015 | ............. A63F 13/00 |
| WO | WO2016081511 | 5/2016 | |
| WO | WO2018036113 A1 | 3/2018 | |
| WO | WO2021087185 | 5/2021 | |

OTHER PUBLICATIONS

Office Action for U.S. Appl. No. 16/890,865, mailed on Apr. 8, 2021, Little, "Insurance Inventory and Claim Generation ", 16 Pages.

Office Action for U.S. Appl. No. 16/890,883, mailed on Nov. 17, 2021, Little, "Interactive Insurance Inventory and Claim Generation", 19 pages.

Office Action for U.S. Appl. No. 16/890,865, mailed on Dec. 22, 2021, Little, "Insurance Inventory and Claim Generation ", 21 Pages.

Office action for U.S. Appl. No. 16/890,883, mailed on Mar. 25, 2021, Little, "Interactive Insurance Inventory and Claim Generation", 15 pages.

Office Action for U.S. Appl. No. 16/890,883, mailed on Jul. 9, 2021, Little, "Interactive Insurance Inventory and Claim Generation", 22 pages.

Office Action for U.S. Appl. No. 16/890,865, mailed on Sep. 1, 2021, Little, "Insurance Inventory and Claim Generation ", 17 Pages.

Wang, I., Smith, J., & Ruiz, J. (May 2019). Exploring virtual agents for augmented reality. Proceedings of the 2019 CHI Conference on Human Factors in Computing Systems, Paper No. 281. doi: 10.1145/3290605.3300511, 12 pages.

Kiang, Y. (Mar. 2016). An augmented reality interface for supporting remote insurance claim assessment. Research Repository, University of Canterbury. Retrieved from https://ir.canterbury.ac.nz/handle/10092/12296, 73 pages.

Office Action for U.S. Appl. No. 17/808,434, mailed on Feb. 23, 2023, Little, "Interactive Insurance Inventory and Claim Generation", 32 Pages.

(56) References Cited

OTHER PUBLICATIONS

Office Action for U.S. Appl. No. 17/469,946, mailed on Nov. 30, 2022, Little, "Vehicular Incident Reenactment Using Three-Dimensional (3D) Representations", 13 Pages.

Office Action for U.S. Appl. No. 17/469,946, mailed on Apr. 11, 2023, Little, "Vehicular Incident Reenactment Using Three-Dimensional (3D) Representations", 15 pages.

Office Action for U.S. Appl. No. 17/808,434, mailed on Oct. 30, 2023, Rebecca A. Little, "Interactive Insurance Inventory and Claim Generation", 35 pages.

Final Office Action issued Feb. 15, 2024 for related U.S. Appl. No. 17/808,434 entitled Interactive Insurance Inventory and Claim Generation (38 pages).

Final Office Action issued Feb. 27, 2024 for related U.S. Appl. No. 17/335,690 entitled "Insurance Claim Generation," (16 pages).

Office Action for U.S. Appl. No. 17/335,690, mailed on Aug. 23, 2023, Rebecca A. Little, "Insurance Claim Generation", 17 pages.

Office Action for U.S. Appl. No. 18/496,042, Dated Jul. 19, 2024, 22 pages.

Office Action for U.S. Appl. No. 17/335,690, Dated Jul. 26, 2024, 19 pages.

Olffice Action for U.S. Appl. No. 17/335,690, Dated Jan. 28, 2025, Little, Insurance Claim Generation , 18 pages.

\* cited by examiner

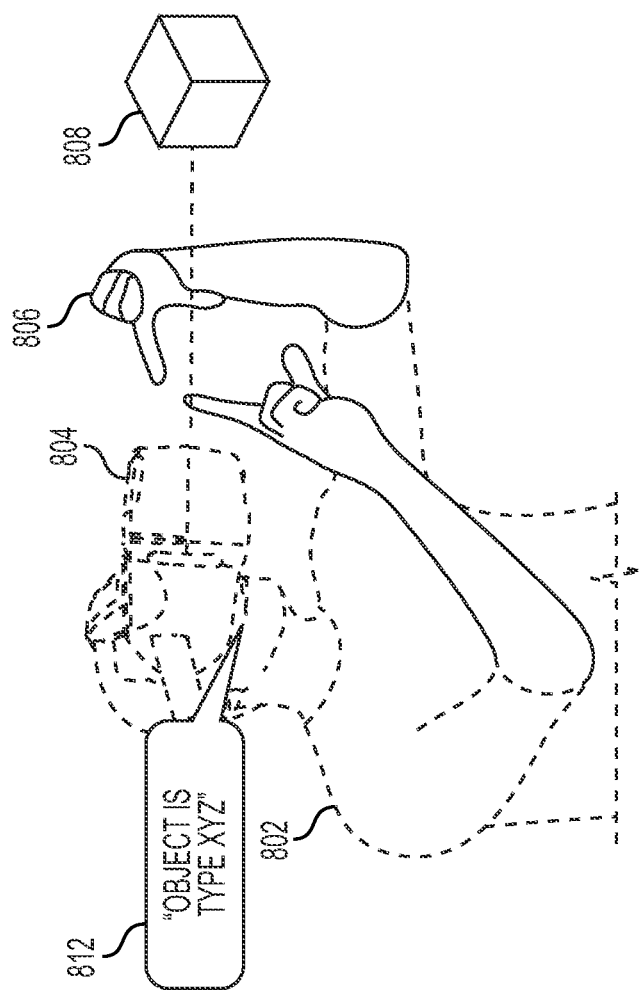
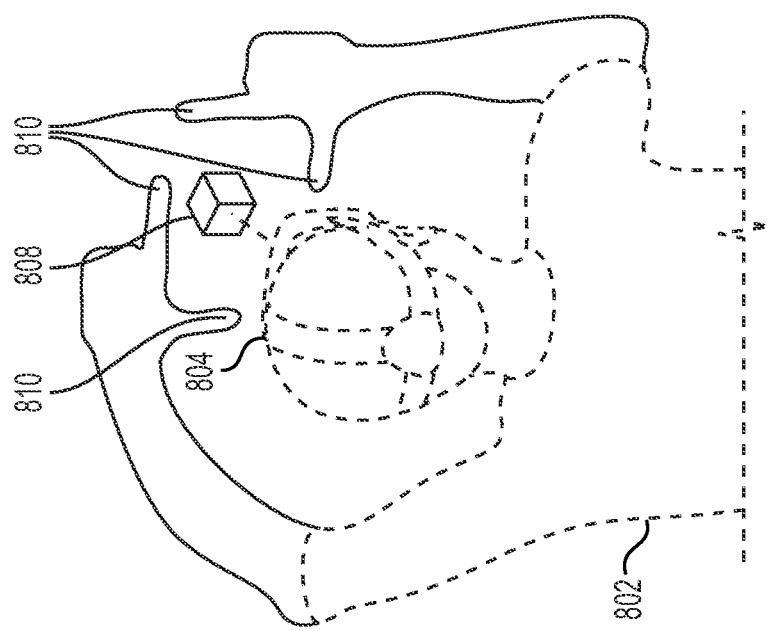
FIG. 8A
FIG. 8B

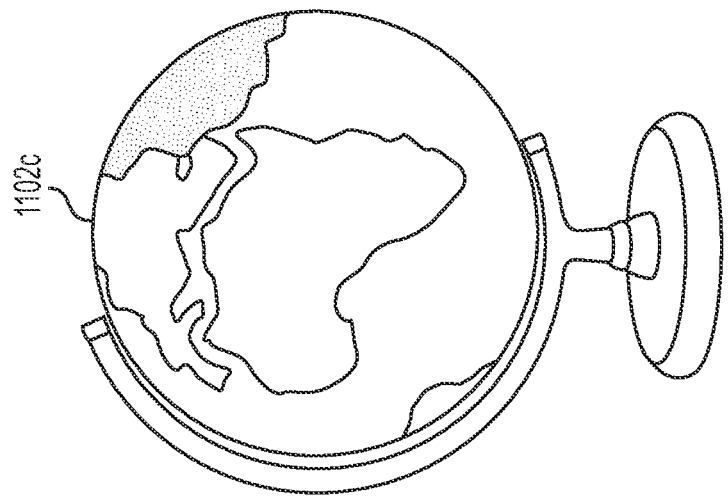
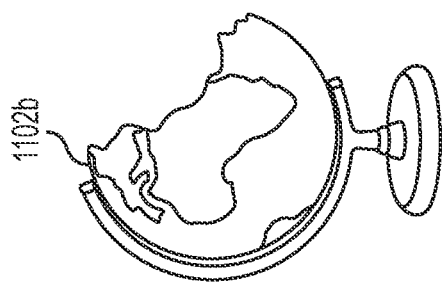
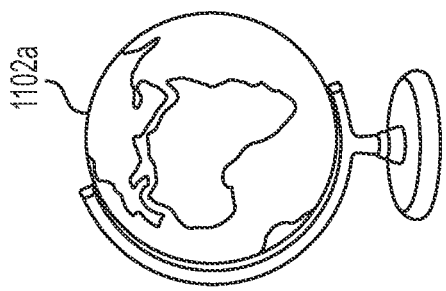
FIG. 11

INSURANCE INVENTORY AND CLAIM GENERATION

CROSS REFERENCE TO RELATED APPLICATIONS

This application is a continuation of copending U.S. patent application Ser. No. 16/890,865 filed Jun. 2, 2020, entitled "Insurance Inventory and Claim Generation," which is incorporated herein by reference in its entirety.

BACKGROUND

Having an inventory of items in an environment such as a home can greatly ease the process of filing an insurance claim after an incident such as a storm, fire or burglary. However, many insurance policy holders never create an inventory. As a result, it can be difficult for a policy holder to verify what she owned prior to the incident. It can also be difficult for a policy holder to verify the condition of her property prior to the incident.

Further, particularly for an incident such as a fire or flood, even records that might substantiate a policy holder's ownership and characteristics of the property may be destroyed by the incident. Due to the trauma of such incidents, it can be difficult for a policy holder to even remember all of the objects that may have been lost or damaged.

It is desirable to provide systems and methods to assist insurance policy holders to create and maintain an inventory of property. It is further desirable to provide systems and methods to assist policyholders in preparing and/or documenting a claim after an incident.

SUMMARY

Techniques described herein employ virtual reality (VR) and/or mixed reality (MR) and/or augmented reality (AR) tools to assist a user such as a policyholder to prepare an inventory of objects in an environment, such as objects owned by the user, located within the user's home and covered by a property insurance policy. In addition, techniques described herein employ virtual reality and/or mixed or augmented reality tools to assist the user in preparing a report of damage to objects after an incident, such as to submit a claim for damage to an insurance company. A virtual assistant may assist the user, for example, much as if an actual assistant were physically present with the user. This can help a user to maximize the use of their insurance coverage.

This disclosure describes, in one aspect, techniques to generate a list of objects. The list may comprise, for example, an inventory or insurance claim. The techniques include receiving image data representing an environment. The techniques further include determining, based at least in part on the image data, an identity of at least one object disposed within the environment. The techniques further include presenting, on a display of an electronic device and based at least in part on the image data, an image including a three-dimensional representation of at least a portion of the environment, a three-dimensional representation of the at least one object disposed at a location in the environment, and a three-dimensional representation of an assistant providing a request related to the at least one object, wherein the request is provided via the display. The techniques further include receiving a first input from a user of the electronic device and based at least in part on the request, wherein in the first input is received via the electronic device. The techniques further include generating an object list based at least in part on the first input and the identity of the at least one object, the list including the at least one object. The object list may be, for example, an inventory or an insurance claim.

This disclosure describes, in another aspect, a system, comprising one or more processors and memory coupled to the one or more processors. The memory stores instructions executable by the one or more processors to perform operations. The operations include receiving image data representing an environment. The operations further include determining, based at least in part on the image data, an identity of at least one object disposed within the environment. The operations further include presenting, on a display of an electronic device and based at least in part on the image data, an image including a three-dimensional representation of at least a portion of the environment, a three-dimensional representation of the at least one object disposed at a location in the environment, and a three-dimensional representation of an assistant providing a request related to the at least one object, wherein the request is provided via the display. The operations further include receiving a first input from a user of the electronic device and based at least in part on the request, wherein in the first input is received via the electronic device, and generating an object list based at least in part on the first input and the identity of the at least one object, the object list including the at least one object.

This disclosure describes, in another aspect, one or more computer-readable media storing instructions that, when executed by one or more processors of at least one device, configure the at least one device to perform operations. The operations include receiving image data representing an environment. The operations further include determining, based at least in part on the image data, an identity of at least one object disposed within the environment. The operations further include presenting, on a display of an electronic device and based at least in part on the image data, an image including a three-dimensional representation of at least a portion of the environment, a three-dimensional representation of the at least one object disposed at a location in the environment, and a three-dimensional representation of an assistant providing a request related to the at least one object, wherein the request is provided via the display. The operations further include receiving a first input from a user of the electronic device and based at least in part on the request, wherein in the first input is received via the electronic device, and generating an object list based at least in part on the first input and the identity of the at least one object, the object list including the at least one object.

With the techniques described herein, an inventory of objects in an environment may be more easily and accurately created, such as for use in documenting an insurance claim. Furthermore, changes to objects in an environment may be more accurately determined which may, for example, assist policyholders in preparing and/or documenting an insurance claim after an incident.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 8A and 8B together illustrate a user wearing a head-mounted VR/AR/MR rendering device.

FIG. 11 illustrates different views of an object.

DETAILED DESCRIPTION

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
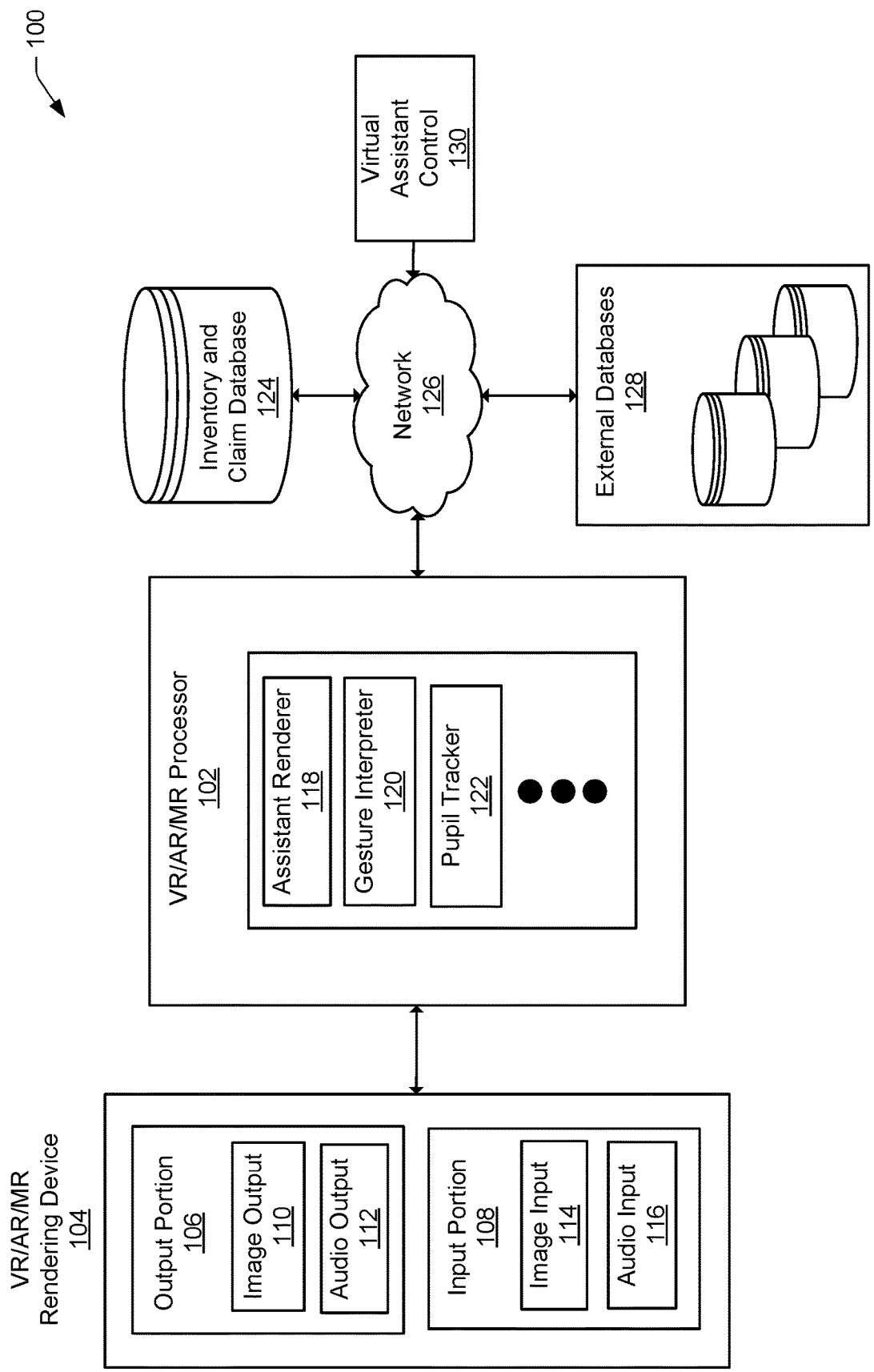
FIG. 1 schematically illustrates an example system in which the described techniques may operate.

FIG. 1 schematically illustrates an example system 100 in which the described techniques may be utilized. Using the techniques in the system 100, a user may better prepare an inventory of objects. In addition, a user may be better able to prepare a report of damage to objects after an incident, such as to submit a claim for damage. In the system 100, a Virtual Reality/Augmented Reality/Mixed Reality (VR/AR/MR) processor 102 is provided. Virtual reality (VR) replaces a view of an actual environment, an actual reality, with a view of a virtual environment, a virtual reality. Augmented reality (AR) provides annotations onto a view of an actual environment. Mixed reality (MR) provides a view of an actual environment mixed with a virtual environment. Mixed reality can include, for example, overlaying spatially registered virtual objects on top of a user's direct view of an actual environment. While VR, AR and MR are sometimes treated as discrete concepts, a line between them in practice may be blurred. In the context of the described techniques, devices utilizing one, some, or all of these concepts may be employed, alone or in combination with each other.

The VR/AR/MR processor 102 may include, for example, one or more processors programmed or otherwise configured to interoperate with a VR/AR/MR rendering device 104. The VR/AR/MR processor 102 and the VR/AR/MR rendering device 104 may be configured for two-way communication, which may be across a network in some examples. The VR/AR/MR rendering device 104 may, for example, include a device such as a flat screen display device via which a mix of a real environment and a virtual environment may be displayed simultaneously, such as in a superimposed manner. In some examples, the VR/AR/MR rendering device 104 is a headset, such as goggles, glasses, or a heads-up display, designed to be worn on or situated relative to the head of a user such that a display of the VR/AR/MR rendering device 104 is disposed in front of the eyes of the user. A heads-up display is a transparent display that presents data without requiring a user to look away from the actual environment the user is viewing.

In the example system 100 shown in FIG. 1, the VR/AR/MR rendering device 104 includes an output portion 106 and an input portion 108. The output portion 106 includes an image output portion 110 and an audio output portion 112. The image output portion 110 may, for example, be a display device such as an LED or LCD display screen. In some examples, the image output portion 110 is a display device that is configured to display an image that appears to be three-dimensional to a user of the VR/AR/MR rendering device 104. The audio output portion 112 may, for example, be one or more speakers such as contained within a headphone to be worn in, over or around one or both ears of the user.

Referring still to the example system 100 shown in FIG. 1, the input portion 108 includes an image input portion 114 and an audio input portion 116. The image input portion 114 may include one or more cameras and/or one or more other visual detection devices. The image input portion 114, in some examples, uses infrared (IR) detection to generate a point-cloud representation of an actual environment. In another example, emission and detection is utilized to generate a point-cloud representation of an actual environment, such as Light Detection and Ranging (LIDAR), a sensing method that uses light in the form of a pulsed laser to measure ranges. A point cloud is a set of data points in a multi-dimensional space, typically a three-dimensional space. The image input portion 114 may be configured to generate pupil data based on a position of a user's eyes. The audio input portion 116 may include, for example, one or more microphones and/or one or more other listening devices.

In some examples, the output portion 106 and input portion 108 are not configured to be disposed in a single device. Furthermore, the image output portion 110 and audio output portion 112 may not be disposed in a single device. Likewise, the image input portion 114 and audio input portion 116 may not be disposed in a single device. As just one example, the audio output portion 112 and the audio input portion 116 may utilize functionality of a smart speaker device that the user already has within the actual environment.

Referring still to FIG. 1, as mentioned above, the VR/AR/MR processor 102 may include, for example, one or more processors programmed or otherwise configured to communicate with and interoperate with the VR/AR/MR rendering device 104. In the example system 100 shown in FIG. 1, the VR/AR/MR processor 102 includes an assistant renderer 118 programmed or otherwise configured to render an assistant on the image output portion 110. The assistant may, for example, be a virtual visual representation having a humanoid appearance. In other examples, other appearances may be used, such as a floating robotic ball. As discussed later, the assistant may assist the user to prepare an inventory of objects and/or a report of damage to objects after an incident.

The VR/AR/MR processor 102 may also include a gesture interpreter 120. The gesture interpreter 120 may be programmed or otherwise configured to interpret one or more gestures of a user of the VR/AR/MR rendering device 104. For example, gestures of the user may include hand or arm movements of the user, eye movements or other non-verbal communication by which the user communicates using visible bodily actions. The VR/AR/MR processor 102 may also include a pupil tracker 122, which is programmed or otherwise configured to determine, based on pupil data, the location in a displayed environment of the user's gaze. The VR/AR/MR processor 102 may include other functionality not shown in FIG. 1.

The VR/AR/MR processor 102 in the example system 100 is connected to an inventory and claim database 124 via a network 126. The inventory and claim database 124 may include, for example, a record of image and audio data received from the output portion 106 of the VR/AR/MR rendering device 104, as well as a repository of information such as metadata about objects in the user's actual environment and/or other environments. The objects may be, for example, objects possessed by the user and which are insured under a property insurance policy against damage, theft and/or other incidents. As another example, the objects may include objects that are permanent fixtures in the actual environment, such as doors or windows.

The VR/AR/MR processor 102 in the example system 100 shown in FIG. 1 also communicates via the network 126 to one or more external databases 128. The external databases 128 may include, for example, records of credit card transactions made by the user and/or a plurality of users, including for purchase of objects in the user's actual environment. As another example, the external databases 128 may include catalog information about objects that may found to be in the user's actual environment and/or in actual environments generally. For example, the external databases 128 may hold pricing or other information from which an identification and/or valuation of objects in the actual environment may be determined. For example, the external databases 128 may include information from e-commerce shopping sites, online auction sites and/or manufacturer catalogs. Using the external databases 128, for example, an inventory of objects that is generated may have greater detail, which will enrich the inventory and will assist in preparing a report for damages after an incident.

The example system 100 shown in FIG. 1 also includes a virtual assistant control system 130, which communicates via the network 126 with the VR/AR/MR processor 102. The virtual assistant control system 130 may operate automatically and/or responsive to human input. For example, the virtual assistant control system 130 may communicate with the assistant renderer 118 of the VR/AR/MR processor 102, providing assistant control data to cause a virtual assistant to be output by the image output portion 110 of the VR/AR/MR rendering device 104. As discussed in greater detail below, the virtual assistant may be displayed to a user of the VR/AR/MR rendering device 104 to assist the user while the example system 100 shown in FIG. 1 performs certain operations, such as generating an inventory of objects in the user's actual environment and/or determining damage to objects to generate an insurance claim for the user.

Figure 2:
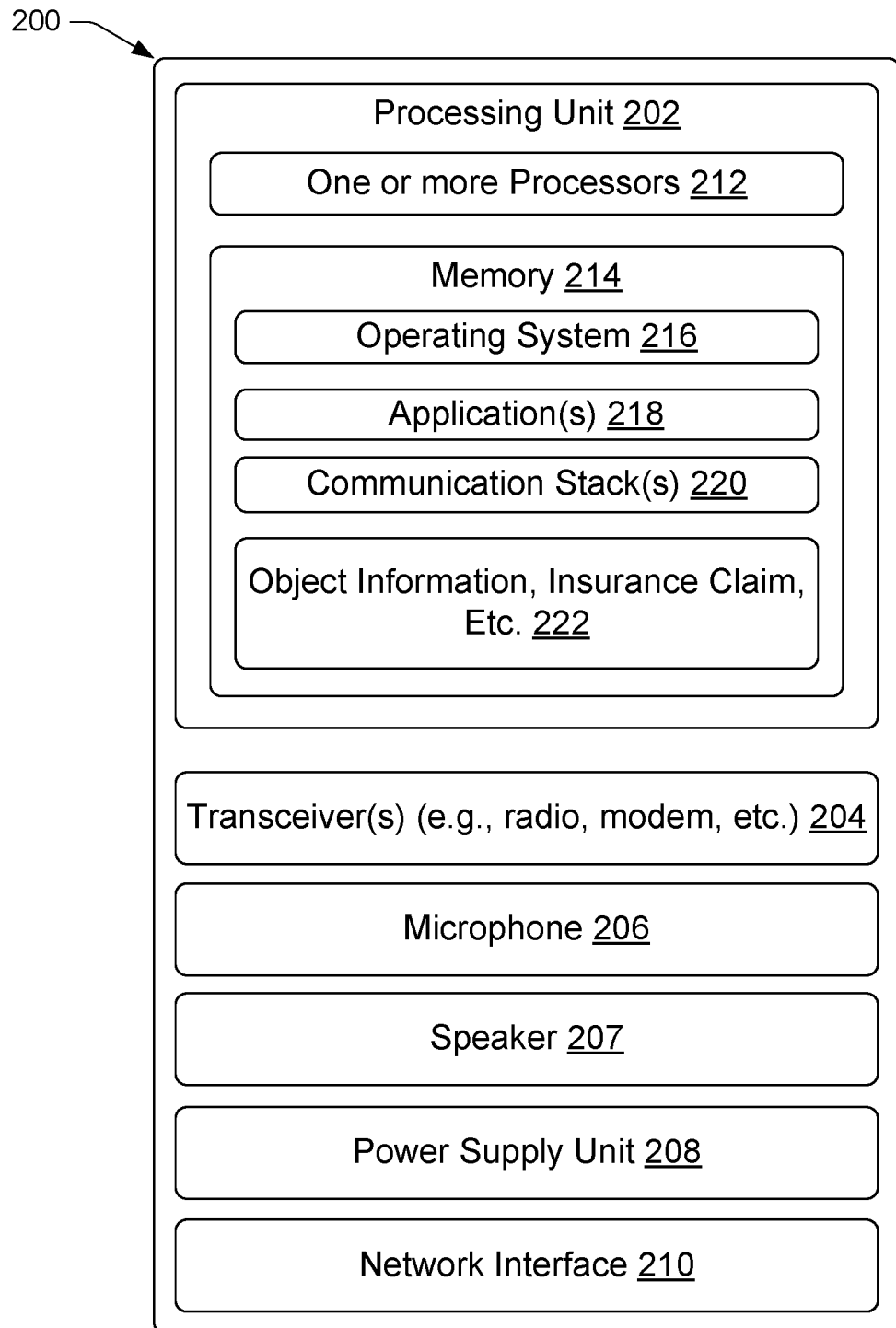
FIG. 2 schematically illustrates components of an example computing device that may be utilized in the example system shown in FIG. 1.

FIG. 2 schematically illustrates components of an example computing device 200. Such components may comprise one or more processors such as the VR/AR/MR processor 102 and/or one or more processors embedded into the VR/AR/MR rendering device 104. The example computing device 200 may comprise any type of device, such as a mobile phone or other mobile computing device (e.g., a tablet computing device), a personal computer such as a desktop computer or laptop computer, a portable navigation device, gaming device, portable media player, television, set-top box, automated teller machine, and so forth. In some examples, the computing device 200 is a computing device that also performs functions other than functionality used in processing VR/AR/MR data. For example, the computing device 200 may be part of a centralized computing system of a home or other premise, or the computing device may be part of an enterprise server system of an insurance company. In some examples, the computing device 200 is a specialized device configured specifically for processing VR/AR/MR data and, in other examples, the computing device 200 may perform other functions as well.

As shown in FIG. 2, an example computing device 200 may include at least one of a processing unit 202, a transceiver 204 (e.g., radio, modem, etc.), a microphone 206, a speaker 207, power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other devices in a network. The transceiver 204 may additionally or alternatively include a modem or other interface device to provide wired communication from the computing device 200 to other devices.

The microphone 206 may comprise physical hardware though, in some cases, an audio input interface may instead be provided to interface to an external microphone or other sound receiving device. Similarly, the speaker 207 may comprise physical hardware though, in some cases, an audio output interface may instead be provided to interface to an external speaker or other sound emitting device. The power supply unit 208 may provide power to the computing device 200. In some instances, the power supply unit 208 comprises a power connector that couples to an Alternating Current (AC) or Direct Current (DC) mains power line. In other instances, such as when the computing device 200 is a mobile phone or other portable device, the power supply unit 208 may comprise a battery.

The memory 214 may include an operating system (OS) 216 and one or more applications 218 that are executable by the one or more processors 212. The OS 216 may provide functionality to present a display portion of a visual/tactile user interface on a display of the computing device 200. The memory 214 may also include one or more communication stacks 220 configured to receive, interpret, and/or otherwise communicate with other devices. For example, the communication stacks may implement one or more of a cellular communication protocol, a Wi-Fi communication protocol, or other wireless or wired communication protocols. The communication stack(s) 220 describe the functionality and rules governing how the computing device 200 interacts with each of the specified types of networks.

The memory 214 may also store other information. For example, the memory 214 may store object information, insurance claim information, etc. 222. The object information may include, for example, image data of an environment, indications of objects identified (such as from the image data) to be in the environment and/or metadata about the identified objects. The insurance claim information may include, for example, an indication of a claim made by a user under a property insurance policy for damage to one or more of the objects.

The various memories described herein (e.g., the memory 214) are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the example computing device 200) are described herein, it should be understood that those computing devices may include other components and/or be arranged differently. As noted above, in some instances, a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

Figure 3:
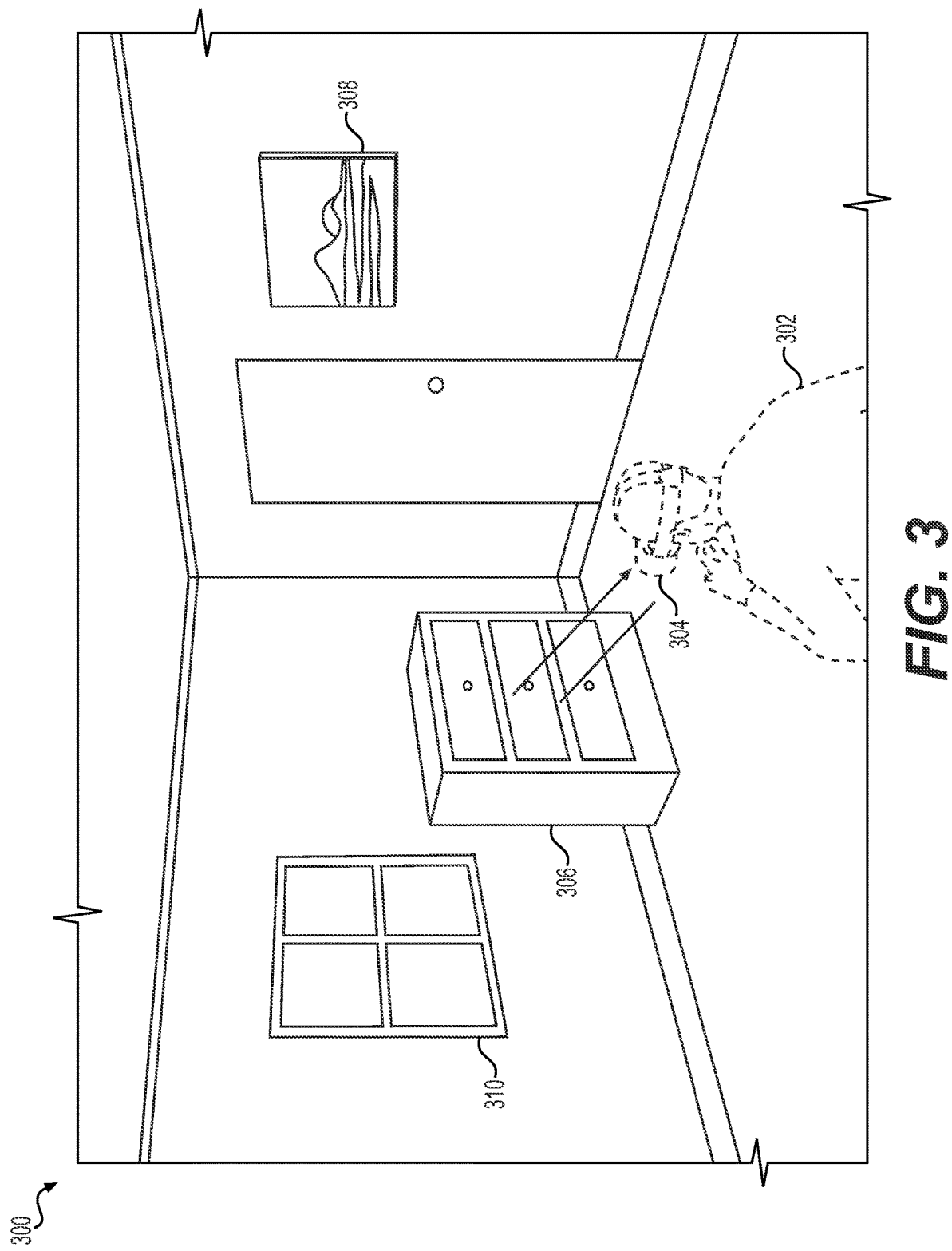
FIG. 3 illustrates a view of an environment as displayed to a user wearing a head-mounted VR/AR/MR rendering device.

FIG. 3 illustrates an example environment 300 as displayed to a user 302 wearing a head-mounted VR/AR/MR rendering device 304. One or more images of the environment 300 that the head-mounted VR/AR/MR rendering device 304 displays to the user may assist the use to generate an inventory of objects and/or prepare a claim for damage to the objects. In FIG. 3, the user 302 and VR/AR/MR rendering device 304 are illustrated with dashed lines, indicating that the user 302 and VR/AR/MR rendering device 304 are not within the view of the user 302 using the VR/AR/MR rendering device 304. Rather, the depiction of the user 302 and VR/AR/MR rendering device 304 is provided to show the perspective of the view of the environment 300. This dashed line depiction for a user and rendering device is used in subsequent figures as well.

The VR/AR/MR rendering device 304 may be configured, for example, like the VR/AR/MR rendering device 104. The image seen by the user 302 may be generated by the VR/AR/MR processor 102 and displayed on an image output portion of the VR/AR/MR rendering device 304. The head-mounted VR/AR/MR rendering device 304 displays to the user 302 the actual environment 300, such as a living room, and/or a representation of the actual environment 300. In the example shown in FIG. 3, the actual environment 300 includes a cabinet 306, a painting 308 and a window 310. This is just an example, and actual environments may include fewer, additional, and/or different objects.

The VR/AR/MR rendering device 304 may display the actual environment 300 (and/or a representation of the actual environment 300, such as a virtual representation) to the user 302 in a virtual-reality, mixed-reality, and/or augmented-reality fashion. That is, in one example, the user 302 may be in the actual environment 300 wearing the head-mounted VR/AR/MR rendering device 304, and the view the VR/AR/MR rendering device 304 may display to the user 302 is an image of the actual environment 300. In another example, an image of the actual environment 300 may have been obtained, and the view the VR/AR/MR rendering device 304 may display to the user 302 is based on the obtained image of the actual environment 300, even if the user 302 is not present in the actual environment 300. In another example, the view the VR/AR/MR rendering device 304 may display to the user 302 is an image of the actual environment 300 with a virtual environment superimposed thereon and/or along with annotations of the actual environment. The immersive aspect of the VR/AR/MR technologies may assist the user 302 to "remember" the before environment, even for portions of the environment that may not have been captured. For example, the immersive aspect of the VR/AR/MR technologies may assist the user 302 to remember what items are inside a drawer, recalled due to spatial memories of the space, even if an image of the inside of the drawer is not captured during an initial capture process.

Figure 4:
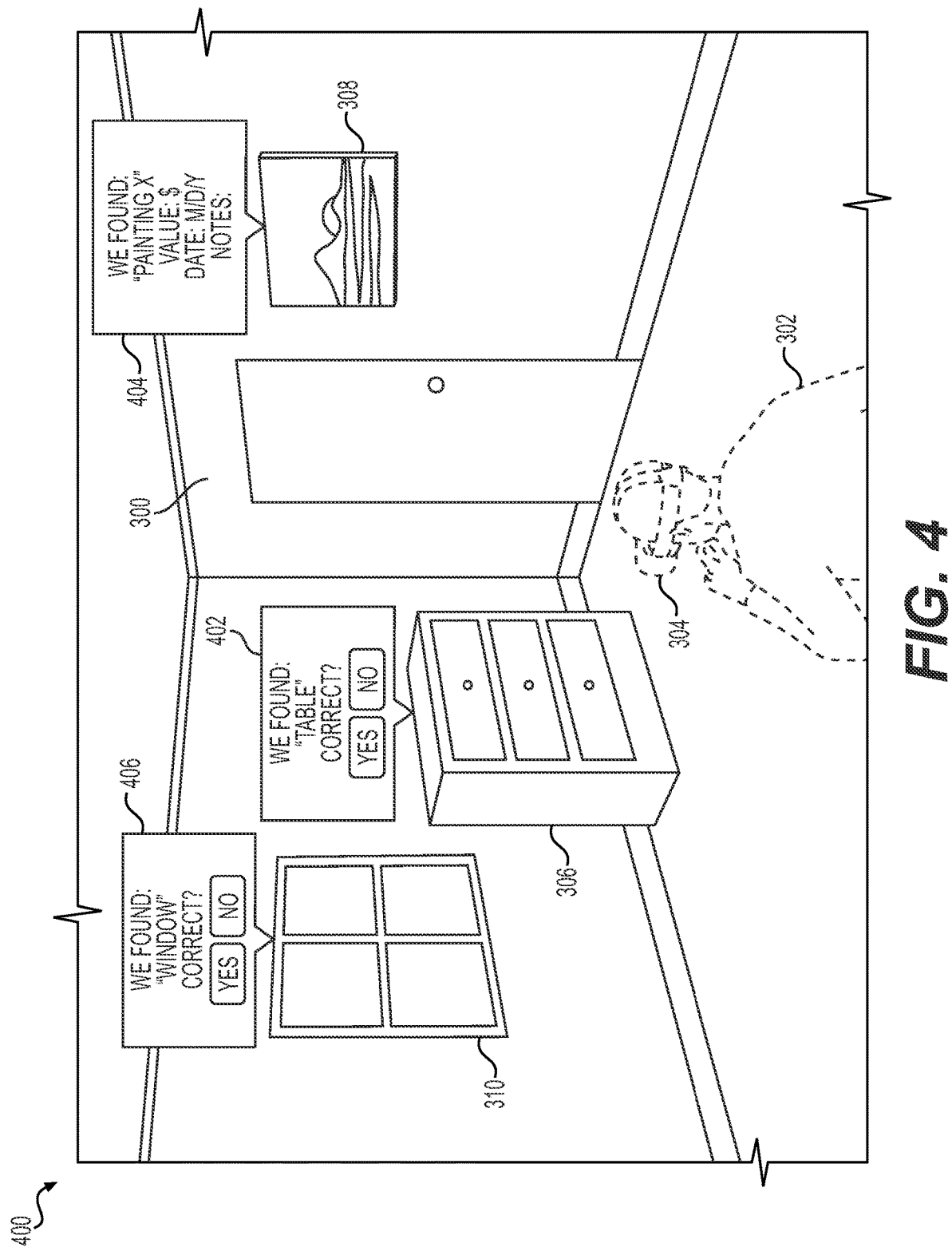
FIG. 4 illustrates an example of a view of the actual environment shown in FIG. 3 that the VR/AR/MR rendering device displays to the user wearing the head-mounted VR/AR/MR rendering device.

FIG. 4 illustrates a view 400 of how the environment 300 may be seen by the user 302 who is wearing the head-mounted VR/AR/MR rendering device 304. As shown in FIG. 4, the VR/AR/MR rendering device 304 displays annotations 402, 404 and 406 to the user 302 wearing the head-mounted VR/AR/MR rendering device 304. The VR/AR/MR processor 102 may, for example, generate data for the annotations 402, 404, 406 and provide the data to the VR/AR/MR rendering device 304 for display to the user 302. The VR/AR/MR rendering device 304 displays the annotations to assist the user in generating an inventory of objects.

The VR/AR/MR processor 102 or an analogous device may receive an image of the environment from the VR/AR/MR rendering device 304 and process the received image to generate the data for the annotations 402, 404, 406. For example, the VR/AR/MR processor 102 or an analogous device may process the received image to recognize objects represented in the received image, using image recognition software, artificial intelligence software, and/or other types of software and/or hardware. For example, a three-dimensional representation of the object in the format of a three-dimensional point cloud may be processed geometrically to determine that the combination and configuration of flat planes versus curved surfaces, size/scale, and color values are likely to compose a certain class of object (e.g., a large flat rectangular prism connected to four longer, thinner rectangular prisms at each corner is likely to be a table) and further a certain make and/or model of that class of object (e.g., comparing the table against a database of geometry for known tables resulting in identifying the manufacturer and/or model of the table). In some examples, the VR/AR/MR processor 102 may communicate with external databases via a network, such as communicating with the external databases 128 via the network 126, to obtain metadata or other information about recognized objects. Furthermore, characteristics like material (metal versus wood) may be identified to provide additional metadata about the objects and, for example, the potential value of the objects. The VR/AR/MR processor 102 may provide an indication of the metadata or other information about the recognized objects to the VR/AR/MR rendering device 304.

The example shown in FIG. 4, the VR/AR/MR processor 102 recognizes the cabinet 306 as a table also recognizes the painting 308 and the window 310. Furthermore, the VR/AR/MR processor 102 or analogous device may obtain metadata or other information about the painting 308 from local information stored within the VR/AR/MR processor 102 or analogous device or from the external databases 128, for example. The VR/AR/MR processor 102 provides an indication of object identifications, the metadata and/or other information to the VR/AR/MR rendering device 304. The VR/AR/MR rendering device 304 displays the object identifications, metadata and/or other information to the user 302 in association with the actual environment 300 and/or a representation of the actual environment 300.

The example shown in FIG. 4, the VR/AR/MR rendering device 304 displays an object identification, metadata, and/or other indication 402 to the user 302 corresponding to the cabinet 306; an object identification, metadata and/or other indication 404 corresponding to the painting 308; and an object identification, metadata and/or other indication 406 corresponding to the window 310. The object identification, metadata and/or other indication 402 includes an indication that the cabinet 306 has been identified as a table, and also includes a request for the user 302 to confirm the identification of the cabinet 306 as a table. The object identification, metadata, and/or other indication 404 includes an indication that the VR/AR/MR processor 102 or analogous device has identified the painting 308, and also includes an indication of a value for the painting 308, a date the user 302 acquired the painting 308, and notes about the painting 308. The object identification, metadata, and/or other indication 406 includes an indication that the VR/AR/MR processor 102 or an analogous device has identified the window 310, and also includes a request for the user 302 to confirm the identification of the window 310. Displaying the indications and accepting input from the user may assist in the generation of an accurate and complete inventory of the objects in the environment 300.

Figure 5:
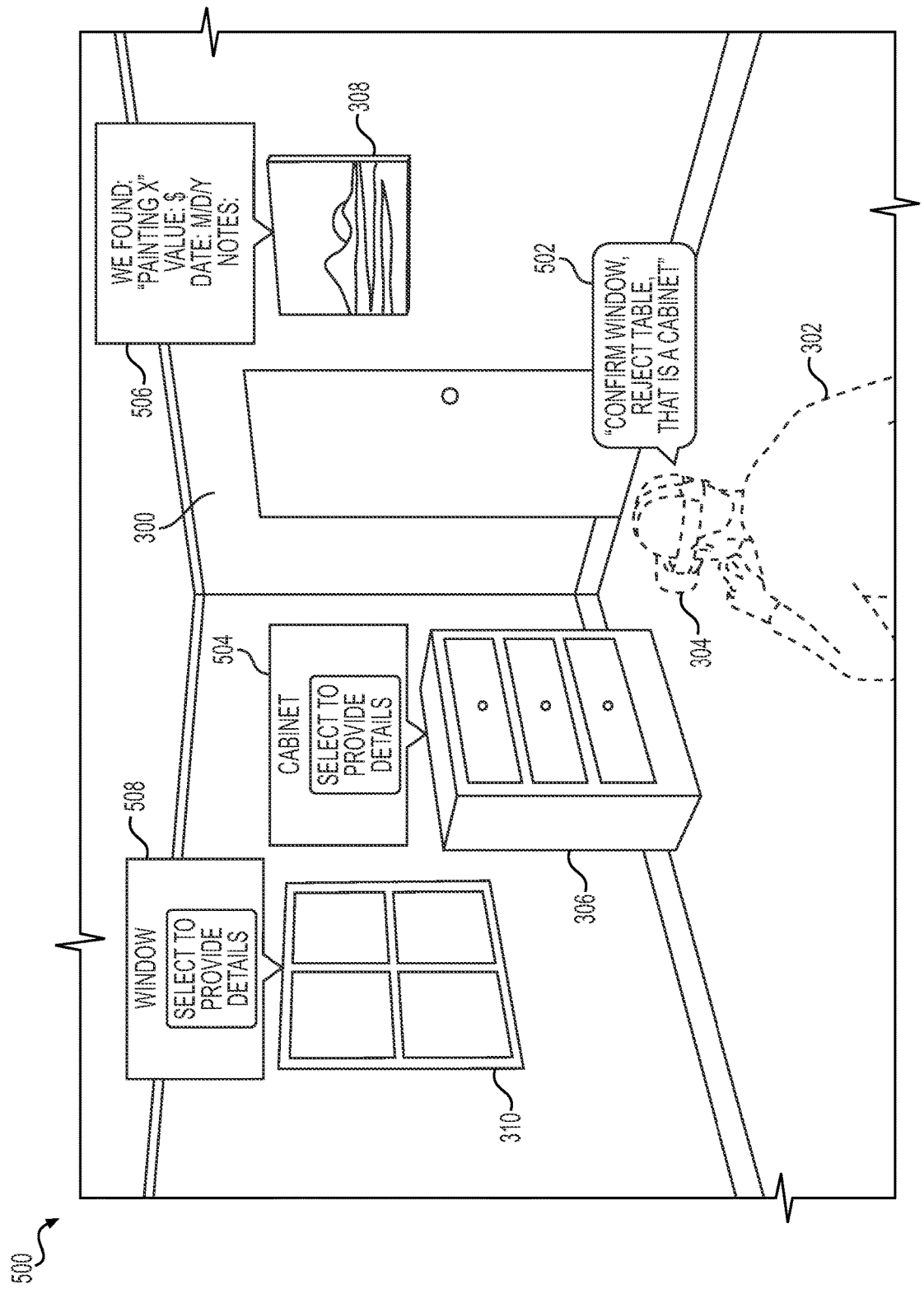
FIG. 5 illustrates another example of a view of the actual environment shown in FIG. 3 that the VR/AR/MR rendering device displays to the user wearing the head-mounted VR/AR/MR rendering device.

FIG. 5 illustrates an example of a view 500 of the environment shown in FIG. 3 that the VR/AR/MR rendering device 304 displays to the user 302 wearing the head-mounted VR/AR/MR rendering device 304. The view 500 the VR/AR/MR rendering device 304 displays to the user 302 is similar to the example view 400 shown in FIG. 4. In the example shown in FIG. 5, while the VR/AR/MR rendering device 304 displays the view 500, the user 302 makes an utterance 502 that the indication 402 (FIG. 4) of the table 306 is incorrect and, rather, that the indication 402 should be of a cabinet. The utterance 502 also confirms the indication 406 of the window 310 is correct. The VR/AR/MR rendering device 304 may provide an indication of the utterance 502 to the VR/AR/MR processor 102, for example. In some examples, the user may make a gesture or other indication in addition to or in place of the utterance 502, and the VR/AR/MR rendering device 304 may provide an indication of the gesture or other indication to the VR/AR/MR processor 102, for example. The VR/AR/MR processor 102 may utilize one or more received indications to populate entries in a database, such as to populate and/or modify entries in the inventory and claim database 124.

In the view 500 shown in FIG. 5, the indication 402 (FIG. 4) has changed to an indication 504 that the object 306 is a cabinet. The indication 504 includes a user interface item the user 302 may select and then provide details about the object 306. Also, the indication 406 has changed to the indication 508. The indication 508 also provides a user interface item the user 302 may select, in this case to provide details of about the window 310. The changes to the indication 402 (to the indication 504) and/or to the indication 406 (to the indication 508) may have resulted from processing the utterance 502. That is, the VR/AR/MR processor 102 may process the user utterance 502 and providing an indication or representation of the indication 504 and the indication 508 to the VR/AR/MR rendering device 302, for display to the user 302. By displaying information about the objects and interacting with the user via a virtual environment, an accurate and complete inventory of objects may be generated.

Figure 6:
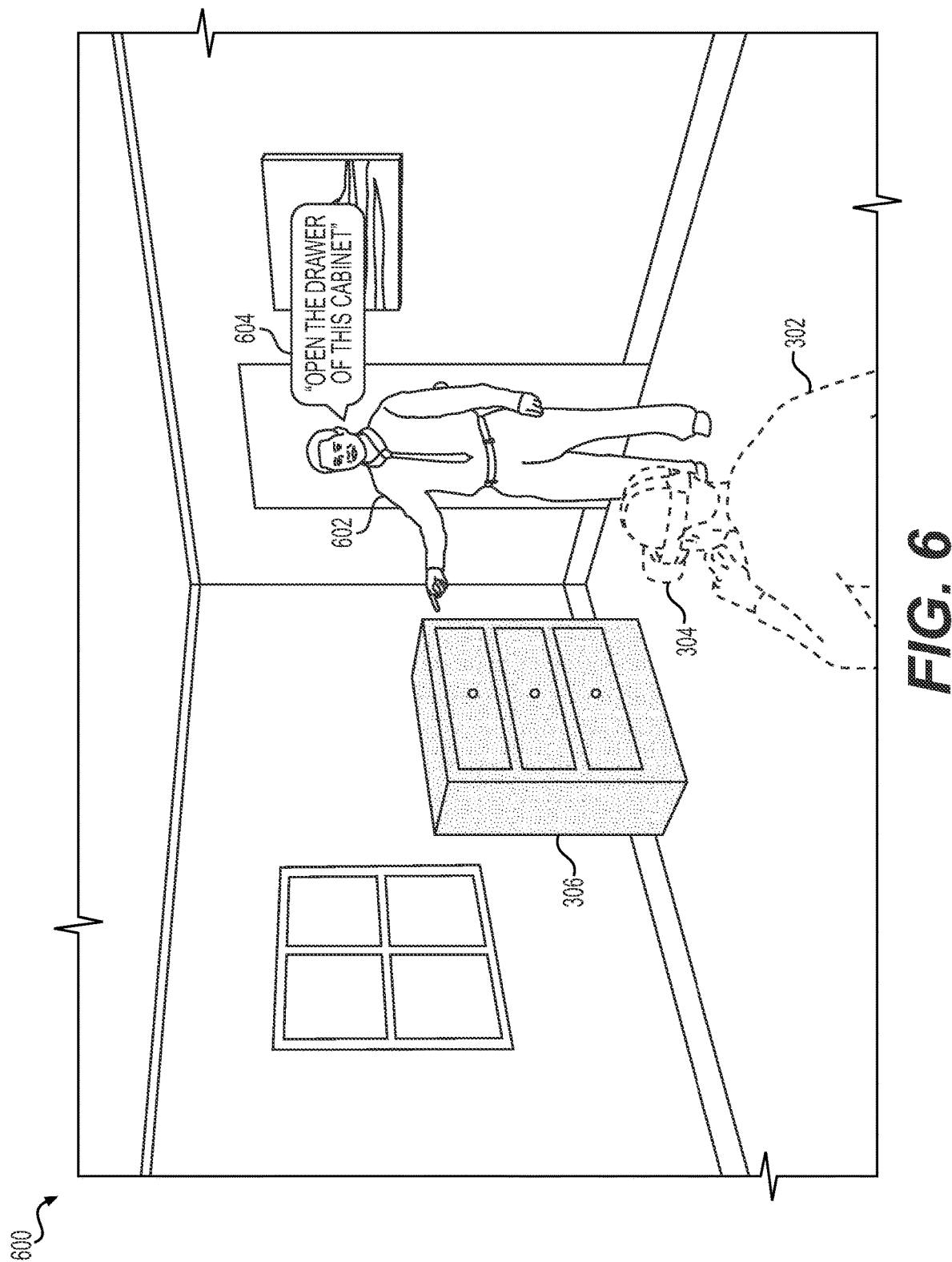
FIG. 6 illustrates another example of a view of the actual environment shown in FIG. 3 that the VR/AR/MR rendering device displays to the user wearing the head-mounted VR/AR/MR rendering device.

FIG. 6 illustrates an example of a view 600 of the environment shown in FIG. 3 that the VR/AR/MR rendering device 304 displays to the user 302 wearing the head-mounted VR/AR/MR rendering device 304. The view 600 the VR/AR/MR rendering device 304 displays to the user 302 is similar to the view 300, the view 400 and the view 500. In the view 600, a virtual assistant 602 is assisting the user 302 to generate the inventory of objects.

That is, in the view 600, the VR/AR/MR rendering device 304 displays to the user 302 the virtual assistant 602 that is not present in the actual environment. For example, referring back to FIG. 1, the virtual assistant control system 130 may communicate via the network 126 to the VR/AR/MR processor 102. The virtual assistant control system 130 may operate automatically, responsive to human input, or some combination. For example, the virtual assistant control system 130 may communicate with the assistant renderer 118 of the VR/AR/MR processor 102 to cause the VR/AR/MR rendering device 304 to display the virtual assistant 602 on an image output portion of the VR/AR/MR rendering device 304.

The VR/AR/MR processor 102 may cause the VR/AR/MR rendering device 304 to display the virtual assistant 602 as pointing to or otherwise non-verbally indicating the cabinet 306. The VR/AR/MR processor 102 may cause the VR/AR/MR rendering device 304 to display the cabinet 306 in a highlighted manner or otherwise emphasized. This may assist the user 302 to know that the virtual assistant 602 is pointing to or otherwise non-verbally indicating the cabinet 306.

In addition to the virtual assistant 602 pointing to or otherwise non-verbally indicating the cabinet 306, the VR/AR/MR rendering device 304 may cause the virtual assistant 602 to verbally or non-verbally request the user 302 to perform an action on an object in the actual environment, such as the cabinet 306. In the view 600 shown in FIG. 6 600, the VR/AR/MR rendering device 304 is causing the virtual assistant to make an utterance 604, requesting the user 302 to open the drawer of the cabinet 602, so that the inventory of objects may include more complete information about the cabinet 602 and/or contents of the cabinet. The user 302 may perform the requested action in the actual environment so, for example, an image the input portion of the VR/AR/MR rendering device 304 obtains includes imagery that would not otherwise be included, such as the inside of the drawer. In some examples, the virtual assistant 602 may request the user 302 to manipulate an object in the actual environment so that an image input portion of the VR/AR/MR rendering device 304 may be able to obtain an image of a label on the object, such as to obtain an image that includes a model number, serial number or other pertinent information about the object.

The VR/AR/MR processor 102 may utilize the information about an object to populate one or more entries in a database, such as to populate and/or modify entries in the inventory and claim database 124. In some examples, the VR/AR/MR processor 102 may access external databases, like external databases 128, to get additional information about the object using the information and may populate the one or more entries in the inventory and claim database 124 using the additional information. For example, if the information about the object includes a model number, the VR/AR/MR processor 102 may access an external e-commerce database to get additional information such as a value of the object.

Figure 7:
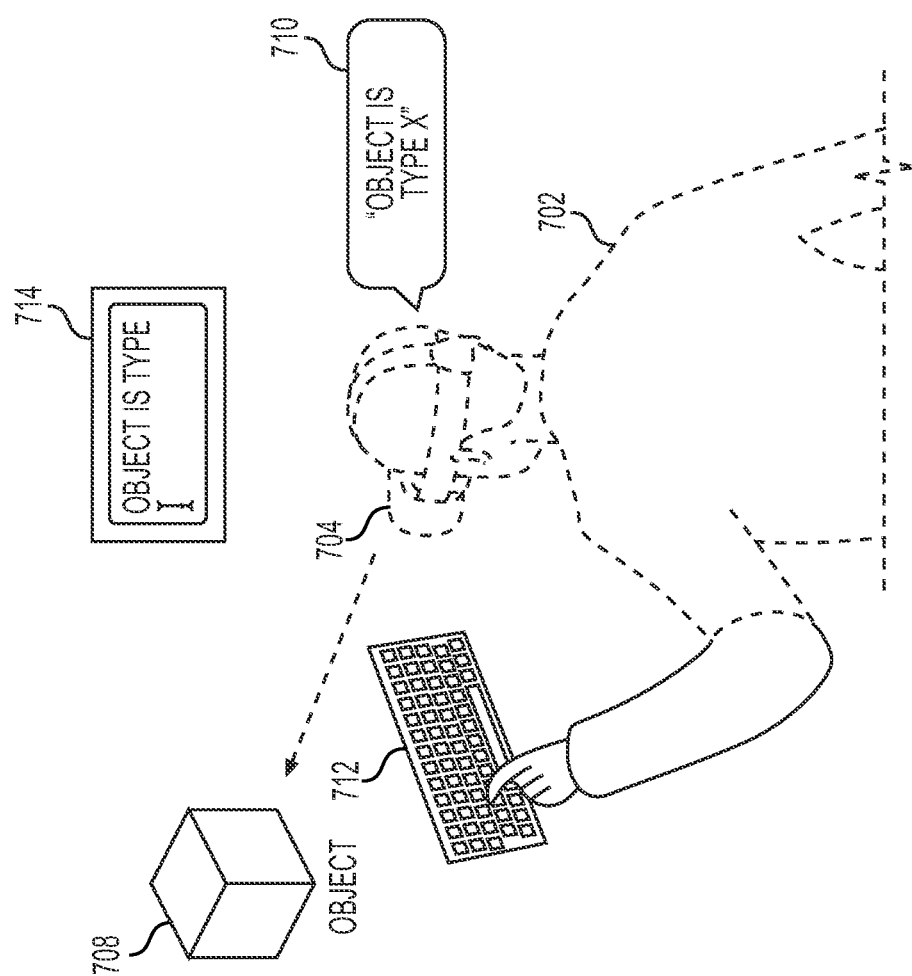
FIG. 7 illustrates a user wearing a head-mounted VR/AR/MR rendering device.

FIG. 7 illustrates a user 702 wearing a head-mounted VR/AR/MR rendering device 704. As shown in FIG. 7, methods of user input and interaction that are enabled by the VR/AR/MR technology assist in the process of generating an inventory of objects. The VR/AR/MR rendering device 704 may be similar to the VR/AR/MR rendering device 304 or to the VR/AR/MR rendering device 104. The VR/AR/MR rendering device 704 includes functionality to generate pupil data to determine the sight direction 706 of the user 702. The sight direction determination functionality may include, for example, an imager within the VR/AR/MR rendering device 704 that may capture an image of the eyes of the user 702 and a processor to process the captured image to determine a location of the pupils of one or both eyes. From the locations of the pupils, the sight direction 706 may be determined. In some examples, the VR/AR/MR rendering device 704 determines the sight direction and, in other examples, the VR/AR/MR rendering device 704 provides the captured image to the VR/AR/MR processor 102, to perform sight direction.

In the example shown in FIG. 7, the user's sight direction 706 is toward an object 708. The VR/AR/MR rendering device 704 may display the object 708 to the user 702 in a highlighted manner or otherwise indicating the object 708 to the user 702.

The user 702 may also provide information relevant to the object 708, such as by making an utterance 710 about the object 708. Other means for the user 702 to provide the information about the object 708 may be provided. For example, the VR/AR/MR rendering device 704 may display a virtual keyboard 712 to the user 702, and the VR/AR/MR rendering device 704 may recognize movement by the user 702 that indicates the user providing the information 710 to the VR/AR/MR rendering device 704 via the virtual keyboard, such as typing information 714 about the object. The VR/AR/MR rendering device 704 may provide the information 714 about the object 708 and/or the utterance 710 to the VR/AR/MR processor 102. In some examples, there may be several objects in the user's sight direction 706, and the VR/AR/MR rendering device 704 may interact with the user 702 about each of the objects in turn or, for example, allow the user 702 to select an object about which to interact. The VR/AR/MR processor 102 may utilize the information 710 to populate entries in a database, such as to populate and/or modify entries in the inventory and claim database 124.

FIG. 8A and FIG. 8B together illustrate a user 802 wearing a head-mounted VR/AR/MR rendering device 804. The VR/AR/MR rendering device 804 may be similar, for example, to the VR/AR/MR rendering device 304 or to the VR/AR/MR rendering device 104. The VR/AR/MR rendering device 804 may include functionality to detect a gesture 806 made by the user 802 relative to an object 808 in the environment of the user 802. Using the gesture 806 and/or other gestures, the user 802 may interact with the virtual environment in ways that assist in generating a listing of objects for an inventory or insurance claim, for example. In some examples, one or more images including the gesture are provided to the VR/AR/MR processor 102, which has functionality to detect the gesture 806. In the example shown in FIG. 8A and FIG. 8B, the user 802 makes a gesture 806 by framing the object 808 in her view with her fingers 810. This is just an example, and other methods of gesturing are possible, such as pointing or waving. The VR/AR/MR rendering device 804 may display the object 808 to the user 802 in a highlighted manner or otherwise showing that the user 802 has indicated the object 808 with the gesture 806. With the object 806 being indicated, the user 802 may provide information relevant to the object 806, such as by making an utterance 812 about the object 806 that includes the information, or otherwise providing the information. The VR/AR/MR rendering device 804 may provide the information to the VR/AR/MR processor 102. The VR/AR/MR processor 102 may utilize the information to populate entries in a database, such as to populate and/or modify entries in the inventory and claim database 124.

Figure 9:
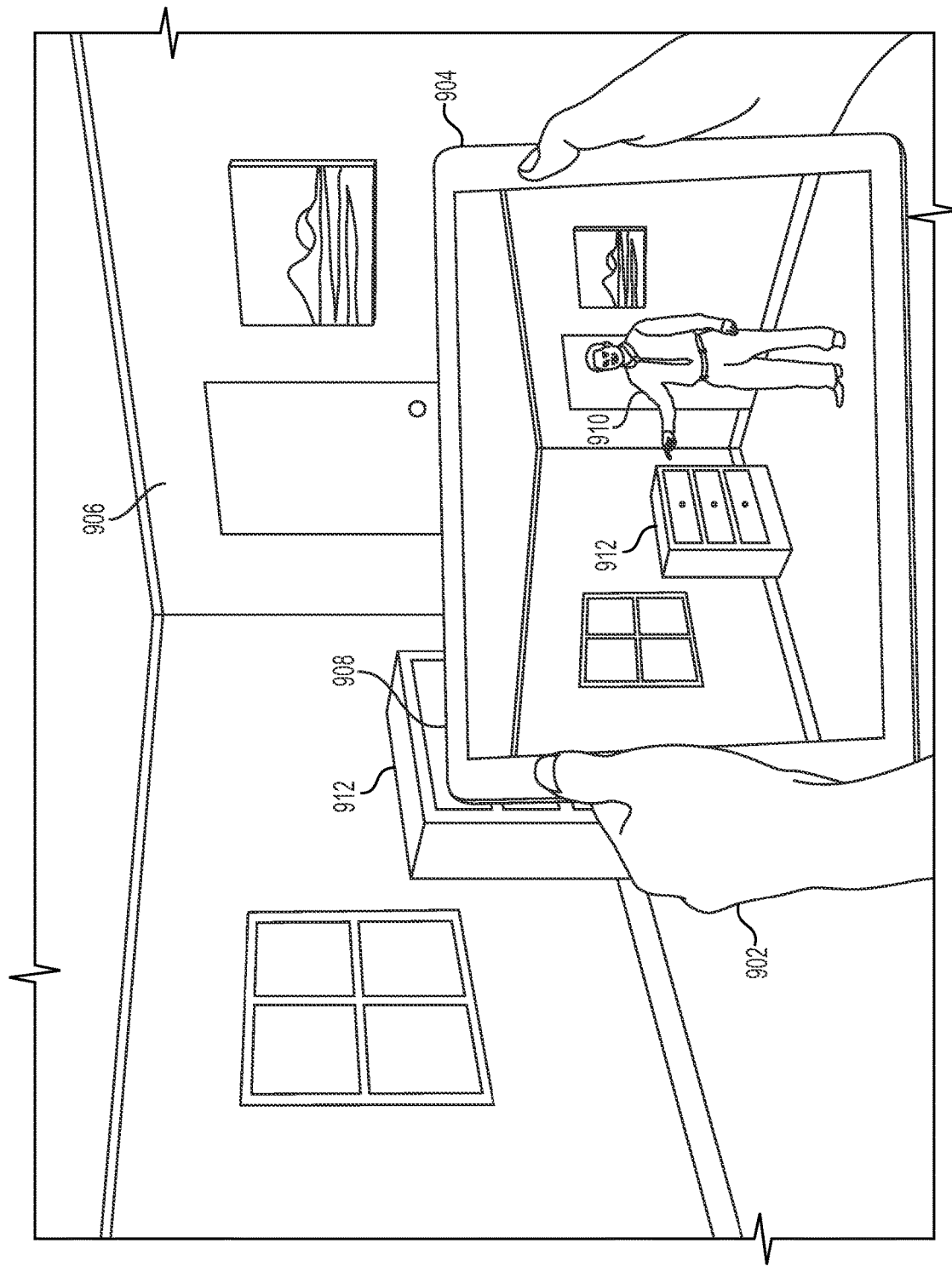
FIG. 9 illustrates a user holding an MR rendering device in an actual environment.

FIG. 9 illustrates a user 902 holding an MR rendering device 904 in an actual environment 906. The MR rendering device 904 displays an image 908 of the actual environment 906 on a display of the MR rendering device 904. The MR rendering device 904 captures an image of the actual environment 906 to generate a data set that is representative of the actual environment 906. In some examples, the captured image includes three-dimensional image data for the actual environment 906. The MR rendering device 904 displays the image 908 based at least in part on the captured image.

In FIG. 9, in addition to displaying an image 908 of the actual environment 906 on a display of the MR rendering device 904, the MR rendering device 904 also displays a virtual assistant 910 that is not present in the actual environment 906. The virtual assistant 910 may assist the user 902 to generate a listing of objects in the actual environment 906, such as an inventory of objects or a listing of objects for an insurance claim.

Referring back to FIG. 1, to display the virtual assistant 910, the virtual assistant control system 130 may communicate via the network 126 to the VR/AR/MR processor 102. The virtual assistant control system 130 may operate automatically, responsive to human input, or some combination. For example, the virtual assistant control system 130 may communicate with the assistant renderer 118 of the VR/AR/MR processor 102 to cause the virtual assistant 910 to be output as part of the image 908 by the MR rendering device 904.

The VR/AR/MR processor 102 may cause the MR rendering device 904 to display the virtual assistant 910 in the image 908 as pointing to or otherwise non-verbally indicating the cabinet 912. The VR/AR/MR processor 102 may cause the MR rendering device to display the cabinet 912 in the image 908 in a highlighted manner or otherwise emphasized. This may assist the user 902 to know that the virtual assistant 910 is pointing to or otherwise non-verbally indicating the cabinet 912.

The user 902 may provide information about the cabinet 912, such as by uttering information about the cabinet 912. The MR rendering device 904 may provide an indication of the information to the VR/AR/MR processor 102, for example. The VR/AR/MR processor 102 may utilize the information to populate entries in a database, such as to populate and/or modify entries in the inventory and claim database 124.

The MR rendering device 904 may display the virtual assistant in the image 908 point to or otherwise non-verbally indicating objects other than the cabinet 912. The user 902 may provide information about the other indicated objects, and the VR/AR/MR processor 102 may utilize the information to populate entries in a database relating to the other objects.

Figure 10:
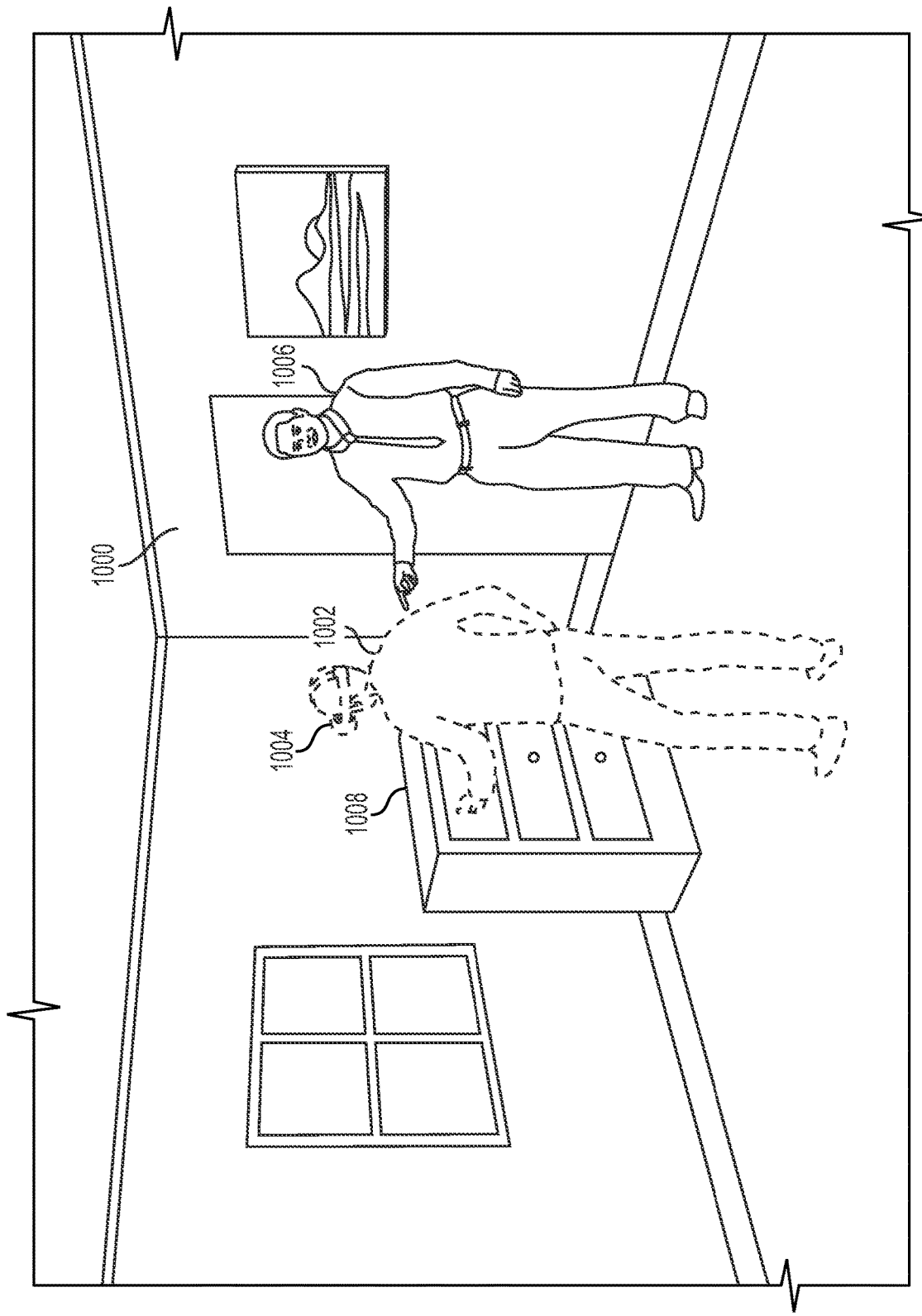
FIG. 10 illustrate a user wearing a VR/AR/MR rendering device.

FIG. 10 illustrates a user 1002 wearing a VR/AR/MR rendering device 1004. The VR/AR/MR rendering device 1004 displays to the user 1002 a view 1000. The VR/AR/MR rendering device 1004 may be capturing an image of an actual environment in real time, such as obtaining point cloud or other data from which a three-dimensional image representative of the actual environment 1000 may be displayed. In some examples, the VR/AR/MR processor 102 provides data, such as point cloud data, to the VR/AR/MR rendering device 1004, which the VR/AR/MR rendering device 1004 processes to generate the view 1000.

The view 1000 includes a virtual assistant 1006 that is not present in the actual environment. The virtual assistant 1006 may assist the user 1002 to generate a listing of objects in the actual environment, such as an inventory of objects or a listing of objects for an insurance claim.

Referring back to FIG. 1, the virtual assistant control system 130 may communicate via the network 126 to the VR/AR/MR processor 102. The virtual assistant control system 130 may operate automatically, responsive to human input, or some combination. For example, the virtual assistant control system 130 may communicate with the assistant renderer 118 of the VR/AR/MR processor 102, to cause the virtual assistant 1006 to be included in the view 1000.

The VR/AR/MR processor 102 may cause the VR/AR/MR rendering device 1004 to display the virtual assistant 1006 in the view 1000 as pointing to or otherwise non-verbally indicating the cabinet 1008. The VR/AR/MR processor 102 may cause the cabinet 1008 in the view 1000 to be highlighted or otherwise emphasized. This may assist the user 1002 to know that the virtual assistant 1006 is pointing to or otherwise non-verbally indicating the cabinet 1008.

The user 1002 may provide information about the cabinet 1008, such as by uttering information about the cabinet 1008. The VR/AR/MR rendering device 1002 may provide an indication of the information to the VR/AR/MR processor 102, for example. The VR/AR/MR processor 102 may utilize the information to populate entries in a database, such as to populate and/or modify entries in the inventory and claim database 124.

FIG. 11 illustrates different views of an object. The object 1102a is shown in an undamaged state. For example, the object 1102a may have been present in an actual environment prior to an incident covered by property insurance. Information about the object 1102a (and sometimes many other objects) may have been collected, for example, as a point cloud representation and stored in the inventory and claim database 124. In addition, metadata about the object 1102a may also have been collected and/or otherwise determined, and stored in the inventory and claim database 124.

The same object (designated as 1102b) is shown at a later time in a damaged state, such as after an incident covered by property insurance. For example, a difference between the object prior to the incident and the object after the incident may exceed a threshold value. In some examples, object identification is carried out by identifying "features" of an object as well as how those features are positioned in comparison with other features. For example, with the globe 1102a, important features may include the base, the top, and the curved connecting piece. Based on the initial capture 1102a, it is known not only what each of those looks like (geometrically and visually) but also how they are situated in relation to each other. A post-event capture of an environment may include a damaged version 1102b of the globe. The object recognition may rely on most of those features still being present. The presence of features may be confirmed and then compared to the database of objects in the original image capture. This may result in finding the features are mostly the same and the ways the features are positioned are mostly the same. This leads to an assumption that the object 1102a and the object 1102b are the same object. Information about the object 1102b may have been collected, for example, as a point cloud representation and stored in the inventory and claim database 124. In addition, metadata about the object 1102b, as damaged, may also have been collected and/or otherwise determined, and stored in the inventory and claim database 124. For example, the metadata may have been collected and/or otherwise determined, after an incident that caused the damage. The damage may include a portion missing from the object 1102b. In other examples, objects are damaged in different manners. In some example, the VR/AR/MR rendering device may display an image that includes guidance during capture of second three-dimensional content. The guidance may include, for example, a virtual assistant that points to or otherwise non-verbally indicates the object 1102b.

The object(designated as 1102c is shown as the object may be displayed to a user of a VR/AR/MR rendering device, such as a user of the VR/AR/MR rendering device 104. An image of the object 1102c is displayed to the user as an image of the undamaged object 1102a in a virtual overlay on top of the damaged object 1102b. This allows the user to see differences between the damaged object 1102b and the undamaged object 1102a. The VR/AR/MR rendering device may, in some examples, generate the image of the object 1102c using information from a database such as the inventory and claim database 124. In some examples, additional information is displayed to the user by the VR/AR/MR rendering device, such as a textual description of the object and/or of damage to the object. The textual description may have been automatically generated, may have been provided by a user and/or may have been retrieved from the inventory and claim database 124 and/or the external databases 128, for example. The object 1102*c* is presented based on an assumption that the object 1102*b* and the object 1102*a* are the same object, within some difference threshold. The difference threshold may be related to the "noise" inherent to the capture process. For example, the capture may not be an exact representation of the object but, rather, may be polluted by the nature of the capture (e.g., a VR/AR/MR device that is not completely still as an image of the object 1102*a* and/or of the object 1102*b* is captured). The object 1102*c* is presented to a user (in some examples, along with a confidence score/percent) for confirmation of the assumption that the object 1102*a* and the object 1102*b* are the same object.

Figure 12:
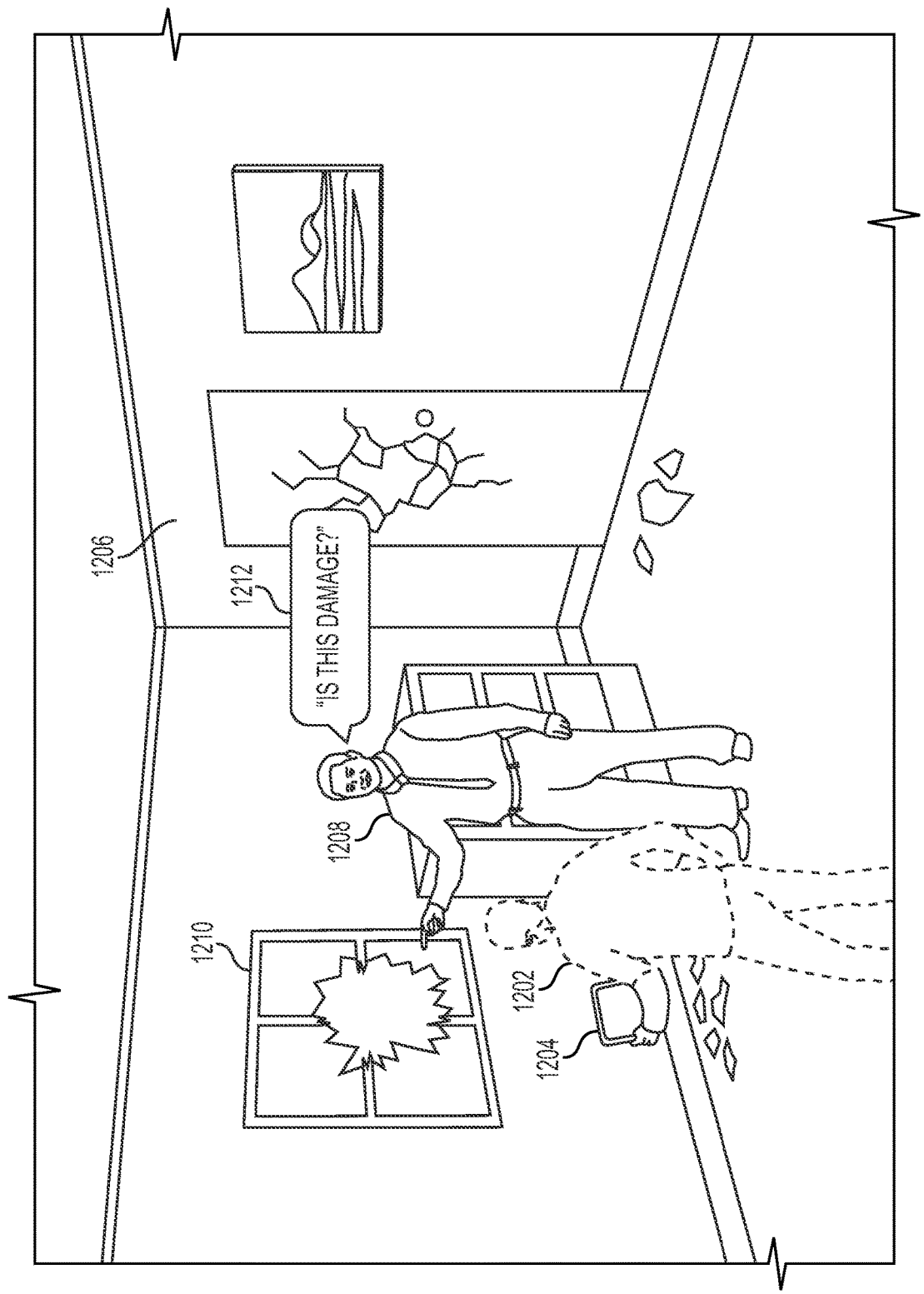
FIG. 12 illustrates a view of an actual environment as displayed to a user on a display of an VR/AR/MR rendering device.

FIG. 12 illustrates a view of an actual environment 1206, after an incident, as displayed to a user 1202 on a display of an VR/AR/MR rendering device 1204. The user 1202 and the VR/AR/MR rendering device 1204 are illustrated to show the perspective of the user 1202, but they are depicted in dashed lines to indicate that they are not part of what is displayed to the user 1202. The VR/AR/MR rendering device 1204 may spatially capture the actual environment 1206 to generate a data set that is representative of the actual environment 1206. For example, the VR/AR/MR rendering device 1204 may include an imaging device such as a three-dimensional scanner, and the VR/AR/MR rendering device 1204 may generate a point cloud or other three-dimensional representation that is representative of the actual environment 1206.

In FIG. 12, in addition to displaying an image of the actual environment 1206 on a display of the VR/AR/MR rendering device 1204, the VR/AR/MR rendering device 1204 also displays a virtual assistant 1208 that is not present in the actual environment 1206. The virtual assistant 1208 may assist the user 1202 to generate a listing of objects in the actual environment, such as a listing of objects for an insurance claim.

Referring back to FIG. 1, the virtual assistant control system 130 may communicate via the network 126 with the VR/AR/MR processor 102. The virtual assistant control system 130 may operate automatically, responsive to human input, or some combination. For example, the virtual assistant control system 130 may communicate with the assistant renderer 118 of the VR/AR/MR processor 102 to cause a virtual assistant to be output by the image output portion of the VR/AR/MR rendering device 1204.

The VR/AR/MR processor 102 may cause the VR/AR/MR rendering device 1204 to display the virtual assistant 1208 in the image as pointing to or otherwise non-verbally indicating the window 1210. The VR/AR/MR processor 102 may cause the window 1210 in the image displayed to the user 1202 in a highlighted manner or otherwise visually indicated. This may assist the user 1202 to know that the virtual assistant 1208 is pointing to or otherwise non-verbally indicating the window 1210. The virtual assistant 1208 may, in some examples, also or instead make an utterance 1212, such as inquiring as to whether the window 1210 is damaged. The virtual assistant 1208 may indicate other objects in the environment 1206.

Figure 13:
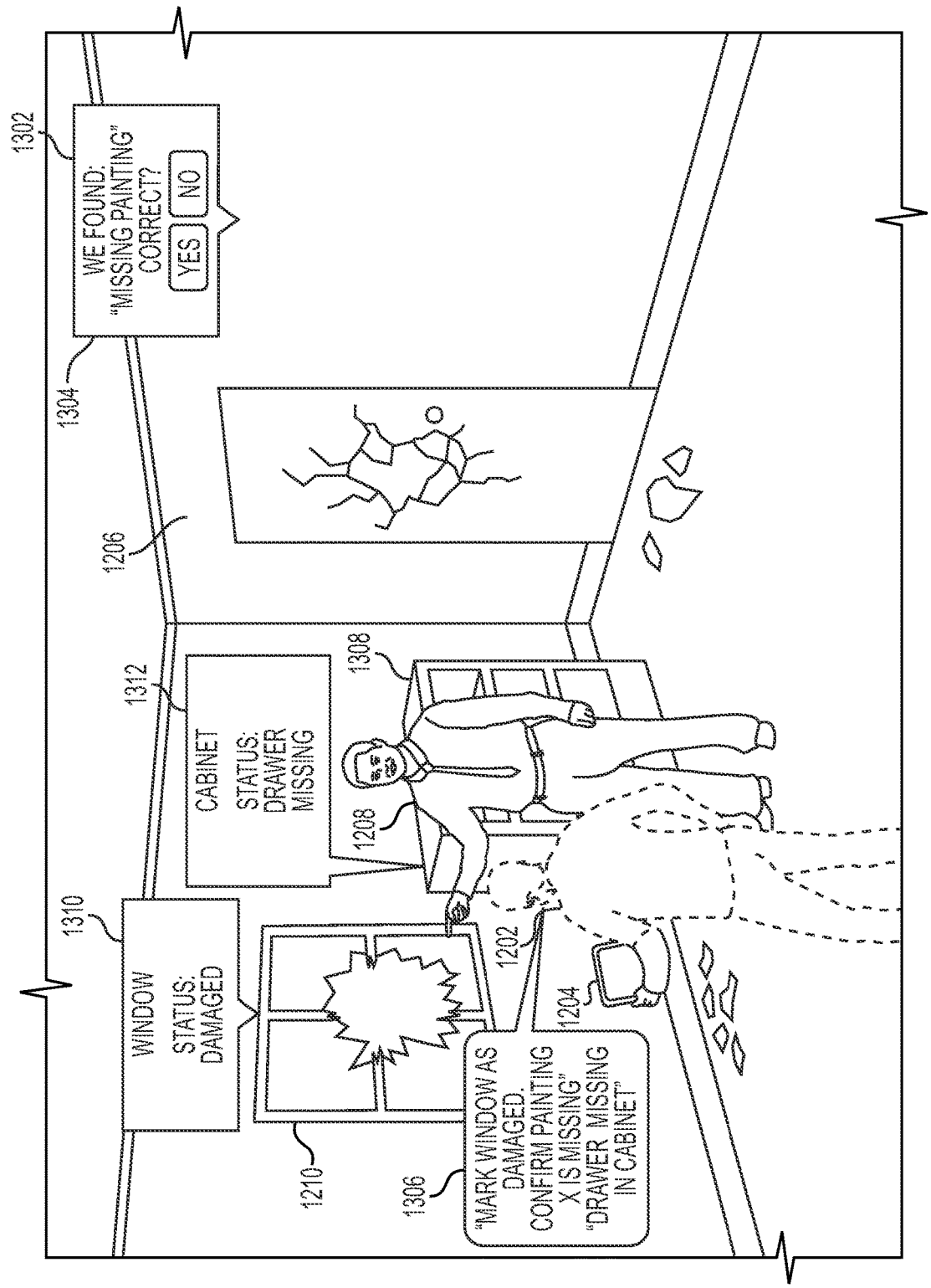
FIG. 13 illustrates an example of a view of the actual environment shown in FIG. 12 that the VR/AR/MR rendering device displays to the user.

FIG. 13 illustrates another example of a view of the actual environment 1206 shown in FIG. 12 that the VR/AR/MR rendering device 1204 displays to the user 1202. The view the VR/AR/MR rendering device 1204 displays to the user in FIG. 13 is similar to the view the VR/AR/MR rendering device 1204 displays to the user in FIG. 12. In the example shown in FIG. 13, while the VR/AR/MR rendering device 1204 displays the view, the VR/AR/MR rendering device 1204 displays an indication 1302 that a painting was determined to be missing, including a request 1304 for the user to confirm. The user 1202 also makes an utterance 1306 indicating that the window 1210 is damaged and confirming that a painting is missing. The user 1202 also states in the utterance 1306, based on observation by the user 1202 and not automatically detected, that a drawer is missing in the cabinet 1308. Displaying the indications and accepting input from the user may assist in the generation of an accurate and complete listing of damaged objects in the environment 1206.

The VR/AR/MR rendering device 1204 may provide an indication of the utterance 1306 to the VR/AR/MR processor 102, for example. In some examples, the user 1202 may make a gesture or other indication in addition to or in place of the utterance 1306. The VR/AR/MR processor 102 may utilize the indication to populate entries in a database, such as to populate and/or modify entries in the inventory and claim database 124.

In the example view shown in FIG. 13, the VR/AR/MR rendering device 1204 displays an indication 1310 that the window 1210 is damaged. The indication 1310 may have be provided as a result of the VR/AR/MR processor 102 processing the utterance 1306 or other indication and providing an indication or representation of the indication 1310 to the VR/AR/MR rendering device 1204, for display to the user 1202. In addition, the VR/AR/MR rendering device 1204 displays an indication 1312 to indicate a status of the cabinet 1308 having a missing drawer.

Figure 14:
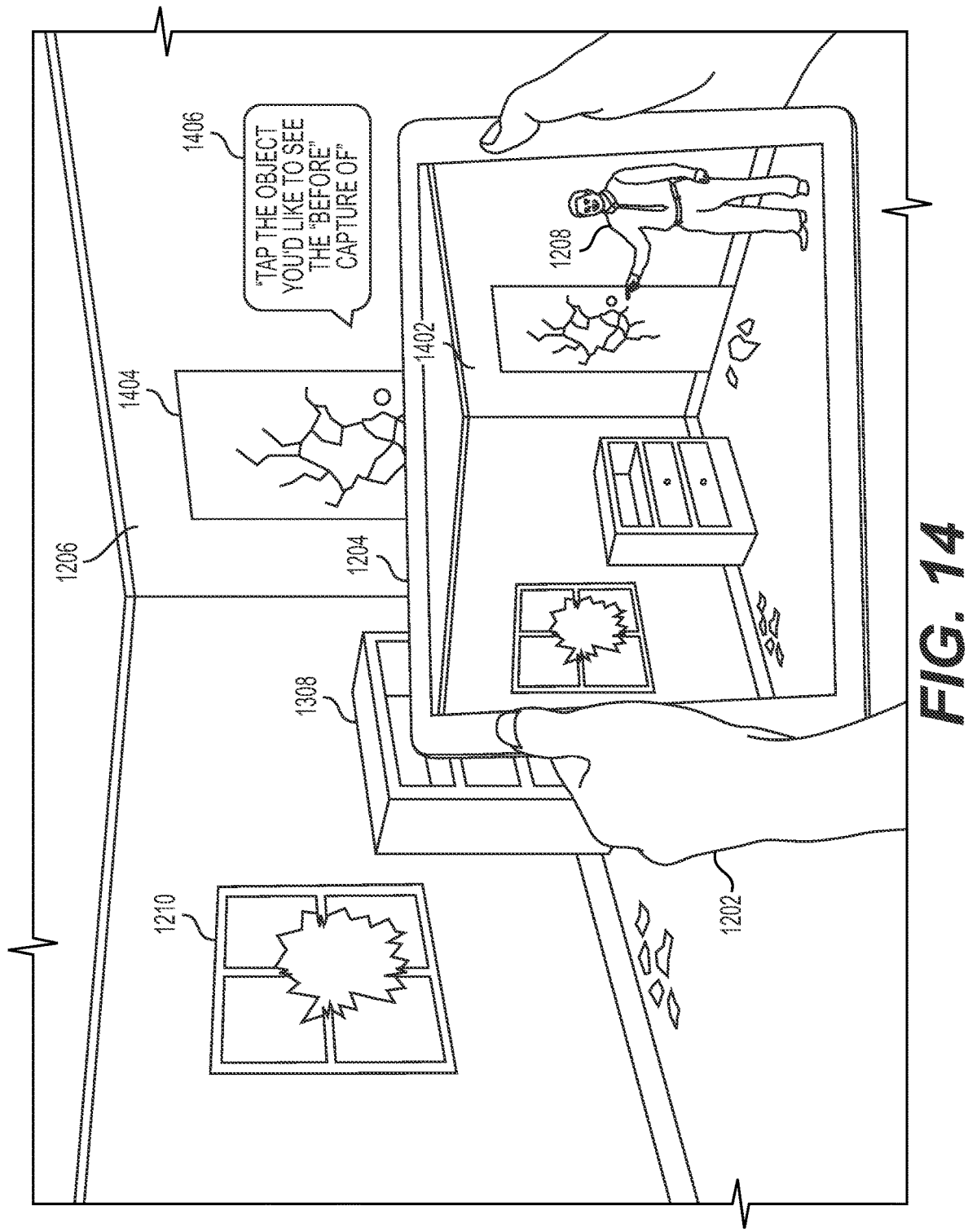
FIG. 14 illustrates an example of a view of the actual environment along with a view that the VR/AR/MR rendering device displays to the user on a display screen.

FIG. 14 illustrates an example of a view of the actual environment 1206 shown in FIG. 12 and FIG. 13. The view of the actual environment 1206 is viewed by the user 1202 simultaneously with a view that the VR/AR/MR rendering device 1204 displays to the user 1202 on a display screen 1402. In FIG. 14, the VR/AR/MR rendering device 1204 displays the virtual assistant 1208. In some examples, the virtual assistant 1208 may point to or otherwise non-verbally indicate an object in the actual environment 1206.

In FIG. 14, the VR/AR/MR rendering device 1204 highlights or otherwise indicates the window 1210, the cabinet 1308 and a door 1404 on the display screen 1402. In addition, the VR/AR/MR rendering device 1204 speaks or otherwise provides an indication 1406 that the user 1202 may tap an object (i.e., touch the display screen 1402 where the object is being displayed) to see the "before" image of the object. In other examples, other methods for the user to indicate an object are provided. By showing the "before" image of an object while the user 1202 is viewing the actual environment 1206, the user 1202 is assisted in generating a listing of objects for an insurance claims.

Figure 15:
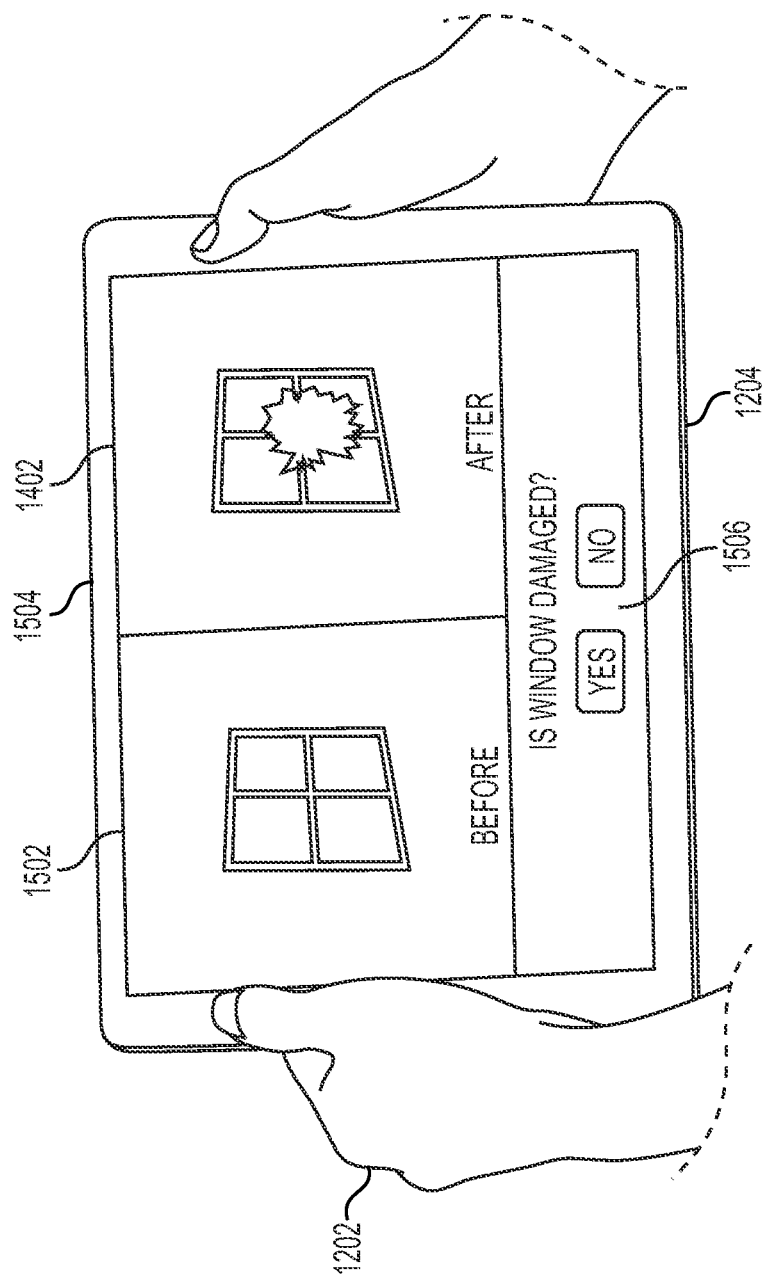
FIG. 15 illustrates the display shown in FIG. 14 after, for example, the user tapped or otherwise indicated an object in the view shown in FIG. 14.

FIG. 15 illustrates the display 1402 of the VR/AR/MR rendering device 1204 being held by the user 1202 after, for example, the user 1202 tapped or otherwise indicated the window 1210, in the view shown in FIG. 14. As shown in FIG. 15, the VR/AR/MR rendering device 1204 provides a "before" view 1502 of the window 1210 next to an "after" view 1504 of the window 1210. For example, to obtain information to display the "before" view, the VR/AR/MR rendering device 1204 may request the information from the VR/AR/MR processor 102. The VR/AR/MR processor 102 may, for example, obtain the information about the window 1210 from the inventory and claim database 124. The VR/AR/MR processor may provide the information about the window 1210 back to the VR/AR/MR rendering device 1204. The VR/AR/MR rendering device 1204 may display the "before" view 1502 based on the information provided back to the VR/AR/MR rendering device 1204. The VR/AR/MR rendering device 1204 may display the "after" view 1504 based on the real-time image of the window 1210 in the actual environment 1206 or, in some examples based on information otherwise provided to the VR/AR/MR rendering device.

The VR/AR/MR rendering device 1204 may also display a user interface item 1506 via which the user 1202 may provide information about whether the window 1210 is damaged. In response to the user 1202 providing the information about whether the window 1210 is damaged, the VR/AR/MR rendering device 1204 may provide the information to the VR/AR/MR processor 102. The VR/AR/MR processor 102 may store the information in the inventory and claim database 124 such as, for example, to complete a listing of objects for an insurance claim.

Figure 16:
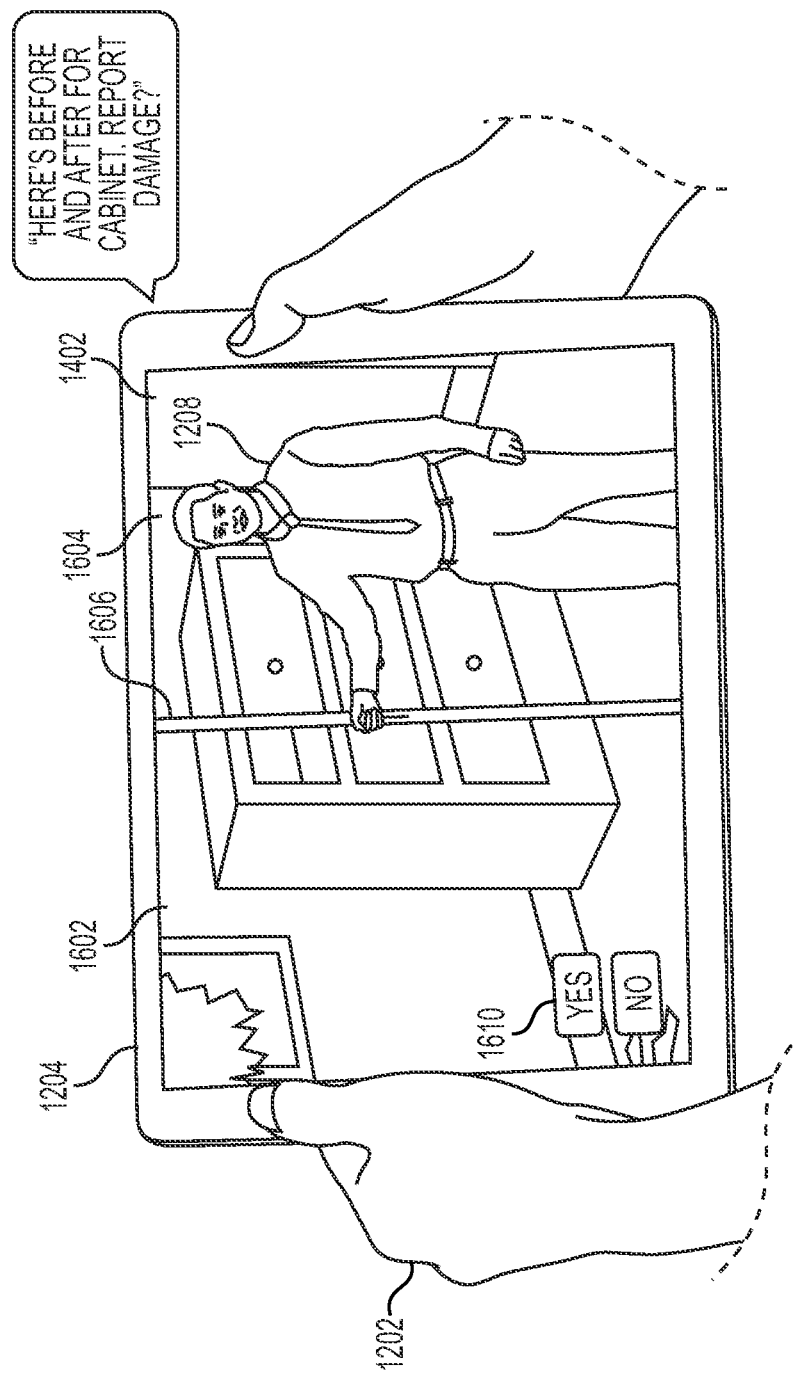
FIG. 16 illustrates another instance of the display shown in FIG. 14, providing a "before" view next to an "after" view.

FIG. 16 illustrates another instance of the display 1402 of the VR/AR/MR rendering device 1204 being held by the user 1202 after, for example, the user 1202 tapped or otherwise indicated the window 1210, in the view shown in FIG. 14. As shown in FIG. 16, the VR/AR/MR rendering device 1204 provides a "before" view 1602 of the window 1210 next to an "after" view 1604 of the window 1210. For example, to obtain information to display the "before" view, the VR/AR/MR rendering device 1204 may request the information from the VR/AR/MR processor 102. The VR/AR/MR processor 102 may, for example, obtain the information about the window 1210 from the inventory and claim database 124. The VR/AR/MR processor 102 may provide the information about the window 1210 back to the VR/AR/MR rendering device 1204. The VR/AR/MR rendering device 1204 may display the "before" view 1502 based on the information provided back to the VR/AR/MR rendering device 1204. The VR/AR/MR rendering device 1204 may display the "after" view 1504 based on the real-time image of the window 1210 in the actual environment 1206 or based on information otherwise provided to the VR/AR/MR rendering device 1204. The virtual assistant 1208 may actively move the slider 1606 from side to side to give the user 1202 an opportunity to view the window 1210 in its entirety in the before state and then in its entirety in the after state. For example, the user 1202 may utter a command to the virtual assistant to move the slider 1606 from side to side. The command may be provided to the VR/AR/MR processor 102. The VR/AR/MR processor 102 may provide the command, via the network 126, to the virtual assistant control system 130. The virtual assistant control system 130 may provide data to the VR/AR/MR processor 102, and the assistant renderer 118 may control the VR/AR/MR rendering device 1204 to render the virtual assistant 1208 and/or the slider 1606.

The VR/AR/MR rendering device 1204 may also display or verbally present a user interface item 1608 asking the user 1202 if damage to the displayed object should be reported. In the example shown in FIG. 16, the user may indicate yes or no via a user interface item 1610. In some examples, the user 1202 may utter a yes or no response. If the user 1202 indicates a yes response, then the VR/AR/MR rendering device 1204 may provide an indication to the VR/AR/MR processor 102, which may then provide the indication to the inventory and claim database 124.

Figure 17:
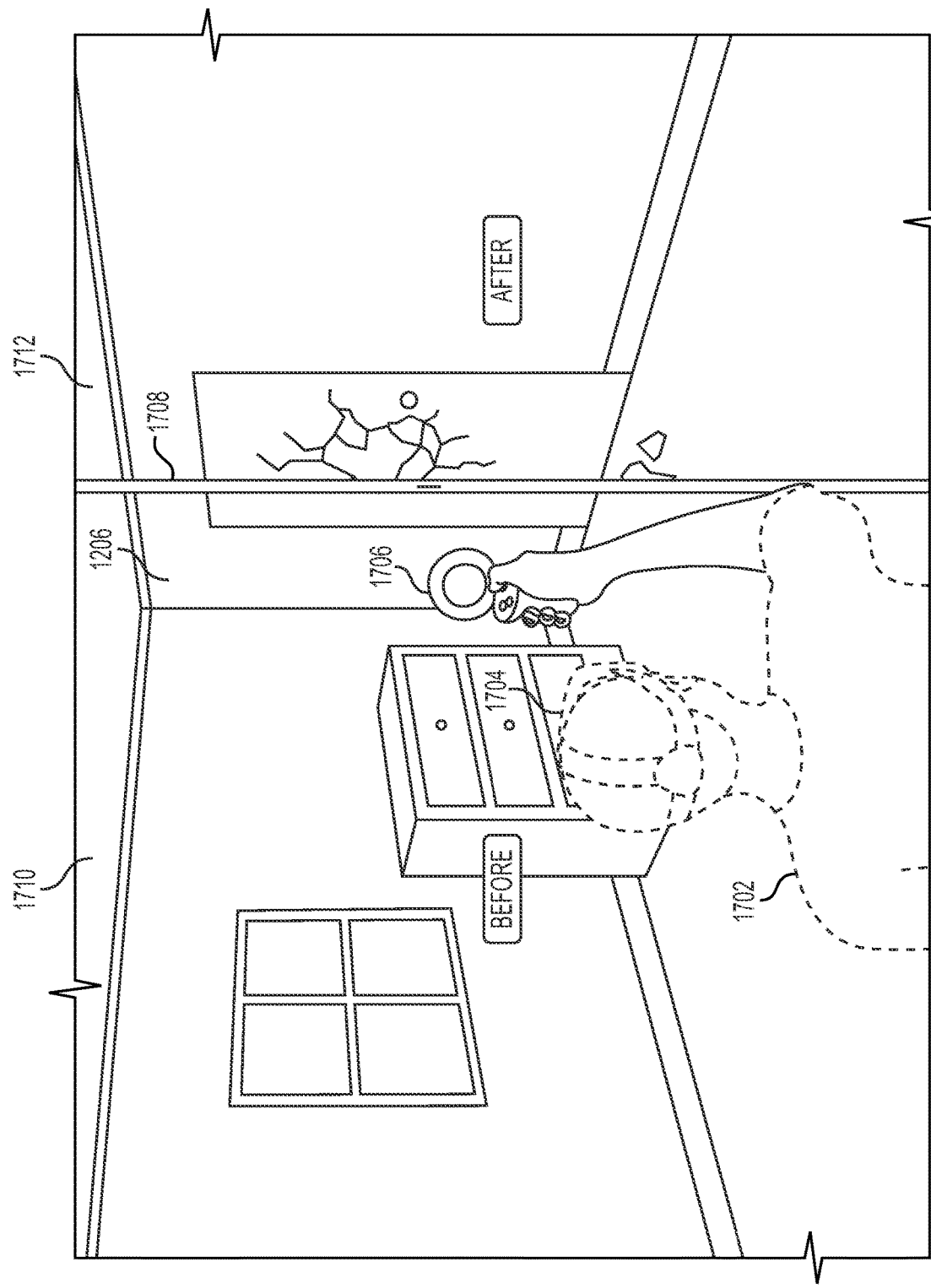
FIG. 17 illustrates a view of an actual environment in which a user is wearing a VR/AR/MR rendering device.

FIG. 17 illustrates a view of the actual environment 1206 in which a user 1702 is wearing a VR/AR/MR rendering device 1704, which may be similar to the VR/AR/MR rendering device 104. The FIG. 17 view, similar to the FIG. 16 view, assists in generating an insurance claim by allowing the user 1702 to see objects in a "before" and "after" state. In FIG. 17, the user 1702 is holding a controller 1706. The controller 1706 provides a user interface to control aspects of a VR/AR/MR system such as the VR/AR/MR system 100. The user 1702, the VR/AR/MR rendering device 1706 and the controller 1706 are illustrated to show the perspective of the user 1702, but they are depicted in dashed lines to indicate that they are not part of what the VR/AR/MR rendering device 1704 displays to the user 1702. Using the controller 1706, the user 1702 may control in some manner how the actual environment 1206 is represented to the user 1702 via a display of the VR/AR/MR rendering device 1704.

As shown in FIG. 17, the VR/AR/MR rendering device 1704 displays to the user 1702 a slider 1708. The slider 1708 visually demarcates a division between two simultaneous side-by-side representations 1710 and 1712 of the actual environment 1206. The slider 1708 is an example, and other types of visual demarcations are possible. The representation 1710 is a "before" representation, such as was generated prior to an incident and saved in the inventory and claim database 124. The representation 1712 is an "after" representation, such as a representation of a state of the actual environment 1206 after an incident, which may be a current state of the actual environment 1206 as the AR/VR/MR rendering device displays the representation 1712 to the user 1202.

As the user 1702 operates the controller 1706, the VR/AR/MR rendering device 1704 displays more or less of the representation 1710 and the representation 1712. For example, as the user 1702 operates the controller 1706 to move the slider 1708 to the left, the VR/AR/MR rendering device 1704 may display less of the "before" representation 1710 and more of the "after" representation 1712. While not shown in FIG. 17, the VR/AR/MR rendering device 1704 may display a virtual assistant in either or both of the representation 1710 and the representation 1712, to further assist the user 1702 in the process of generating an insurance claim.

Figure 18:
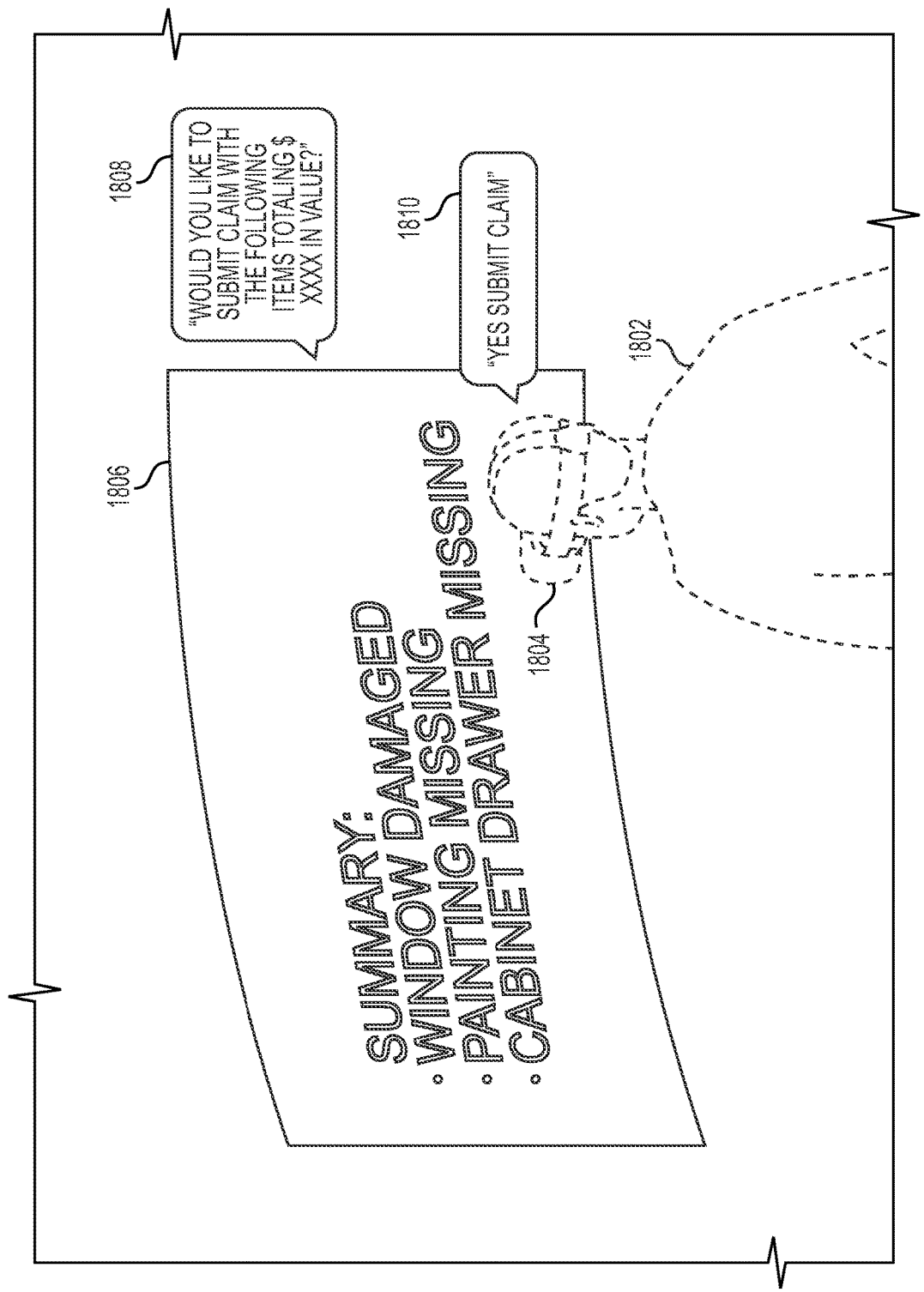
FIG. 18 illustrates a view in which a user 1802 is wearing a VR/AR/MR rendering device 1804 to facilitate submitting an insurance claim.

FIG. 18 illustrates a view in which a user 1802 is wearing a VR/AR/MR rendering device 1804 to facilitate submitting an insurance claim. The VR/AR/MR rendering device 1804 may be similar to the VR/AR/MR rendering device 104. The VR/AR/MR rendering device 1804 displays to the user 1802 an image that includes a summary listing 1806 of objects for which an insurance claim may be submitted. The VR/AR/MR rendering device 1804 provides a query 1808, verbally or visually, as to whether the user 1802 would like to submit an insurance claim that includes the objects listed in the summary 1806. The query 1808 may include additional information, such as a total value of the insurance claim to be submitted.

The user 1802 may make an utterance 1810 or otherwise indicate, such as with a gesture, that the insurance claim should be submitted. For example, the VR/AR/MR renderer 1804 may provide an indication of the utterance 1810 to the VR/AR/MR processor 102. The VR/AR/MR processor 102 may provide the information of the insurance claim, such as including a list of one or more objects, via the network 126 to the inventory and claim database 124.

Figure 19:
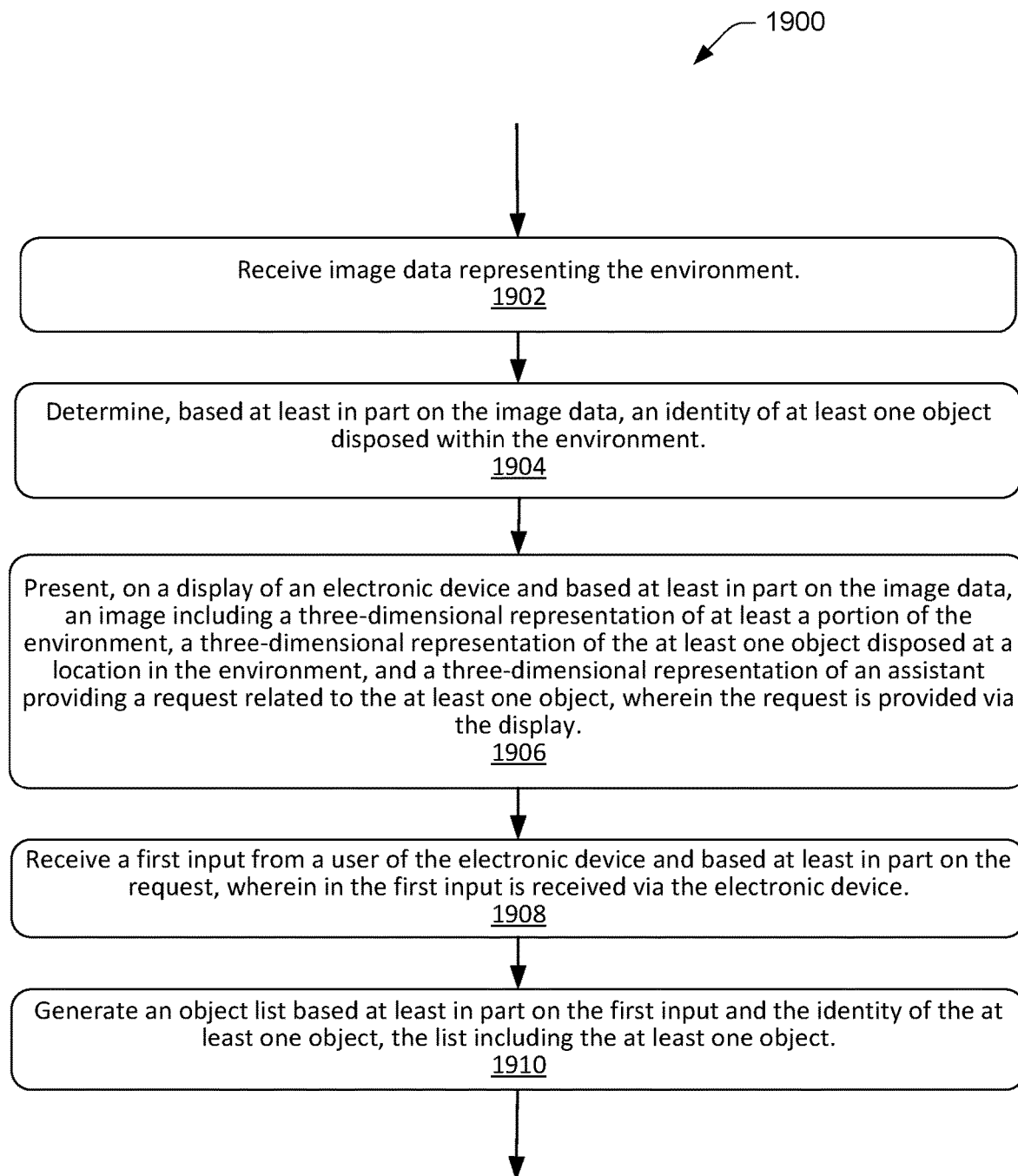
FIG. 19 is a flowchart illustrating a process to provide an immersive environment for a user, to assist in generating an object list such as an inventory or insurance claim.

FIG. 19 is a flowchart illustrating a process to provide an immersive environment for a user, to assist in generating an object list such as an inventory or insurance claim. For ease of illustration the process 1900 may be described as being performed by a device described herein, such as one or more processors of a VR/AR/MR rendering device. However, the process 1900 may be performed by other devices. Moreover, the devices may be used to perform other processes.

The process 1900 (as well as each process described herein) is illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Referring to FIG. 19, the example process 1900 may be used to generate an object list, such as an inventory or insurance claim, for an environment. At 1902, one or more processors receive image data, such as point cloud data, representing the environment. For example, one or more processors of the AR/VR/MR processor 102 may receive image data from the AR/VR/MR rendering device 104. At 1904, the one or more processors determines an identity of at least one object disposed within the environment. The determination may be based at least in part on the image data. For example, the VR/AR/MR processor 102 may be configured to determine the identity of the at least one object using a trained machine learning program or other method, as described above.

At 1906, the one or more processors presents an image on a display of an electronic device. The presented image may be based, for example, on a point cloud of data. The electronic device may be, for example, the VR/AR/MR rendering device 104. The image includes a three-dimensional representation of at least a portion of the environment. The image also includes a three-dimensional representation of the at least one object, disposed at a location in the environment. The image also includes a three-dimensional representation of an assistant providing a request related to the at least one object. The request is provided via the display.

At 1908, the one or more processors receive a first input from a user of the electronic device, based at least in part on the request. For example, the user may be wearing the VR/AR/MR rendering device 104. The user may, for example, make a gesture or speak a response to the request. At 1910, the one or more processors generate an object list based at least in part on the first input and the identity of the at least one object. The object list includes the at least one object. The object list may be, for example, an inventory or insurance claim for the environment.

Figure 20:
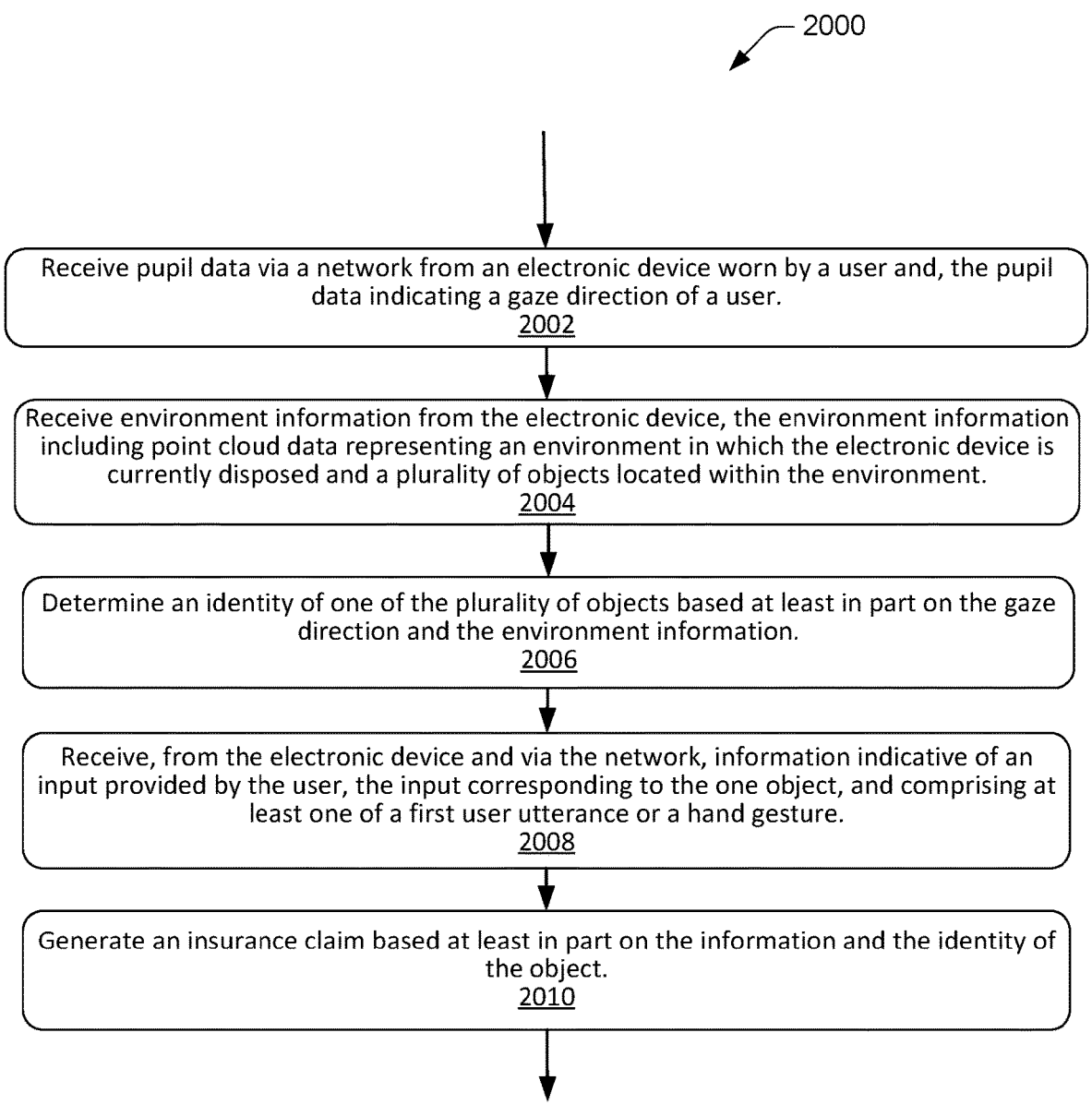
FIG. 20 is a flowchart illustrating a process that utilizes user pupil tracking and user input to generate an insurance claim.

FIG. 20 illustrates an example process 2000 for employing techniques discussed herein, including user pupil tracking, to generate an insurance claim. At 2002, one or more processors receives pupil data from an electronic device worn by a user. For example, the electronic device may be the VR/AR/MR rendering device 104. The electronic device may generate pupil data as discussed, for example, with reference to FIG. 1 and/or with reference to FIG. 7. The electronic device may provide the pupil data to the VR/AR/MR processor 102, which receives the pupil data.

At 2004, the one or more processors receives environment information from the electronic device. The environment information includes point cloud data representing an environment in which the electronic device is currently disposed and a plurality of objects within the environment. For example, as discussed with reference to FIG. 1, a VR/AR/MR rendering device may be configured to use emission and detection to generate a point-cloud representation of an actual environment, such as IR detection or LIDAR, to generate a point cloud of an environment.

At 2006, the one or more processors determines an identity of one of the plurality of objects based at least in part on the gaze direction and the environment information. For example, the VR/AR/MR processor 102 may include an image recognition machine learning engine that is trained to recognize objects in an environment.

At 2008, the one or more processors receive, from the electronic device, information indicative of input provided by the user. The input corresponds to the one object, and comprises at least one of a first utterance or a hand gesture. For example, the input may include information indicative of a confirmation from the user of the identity of the object. As yet another example, the input may include information indicative of a confirmation from the user that the one object has been damaged as a result of an incident. At 2010, the one or more processors generates an insurance claim based at least in part on the information and the identity of the object.

Figure 21:
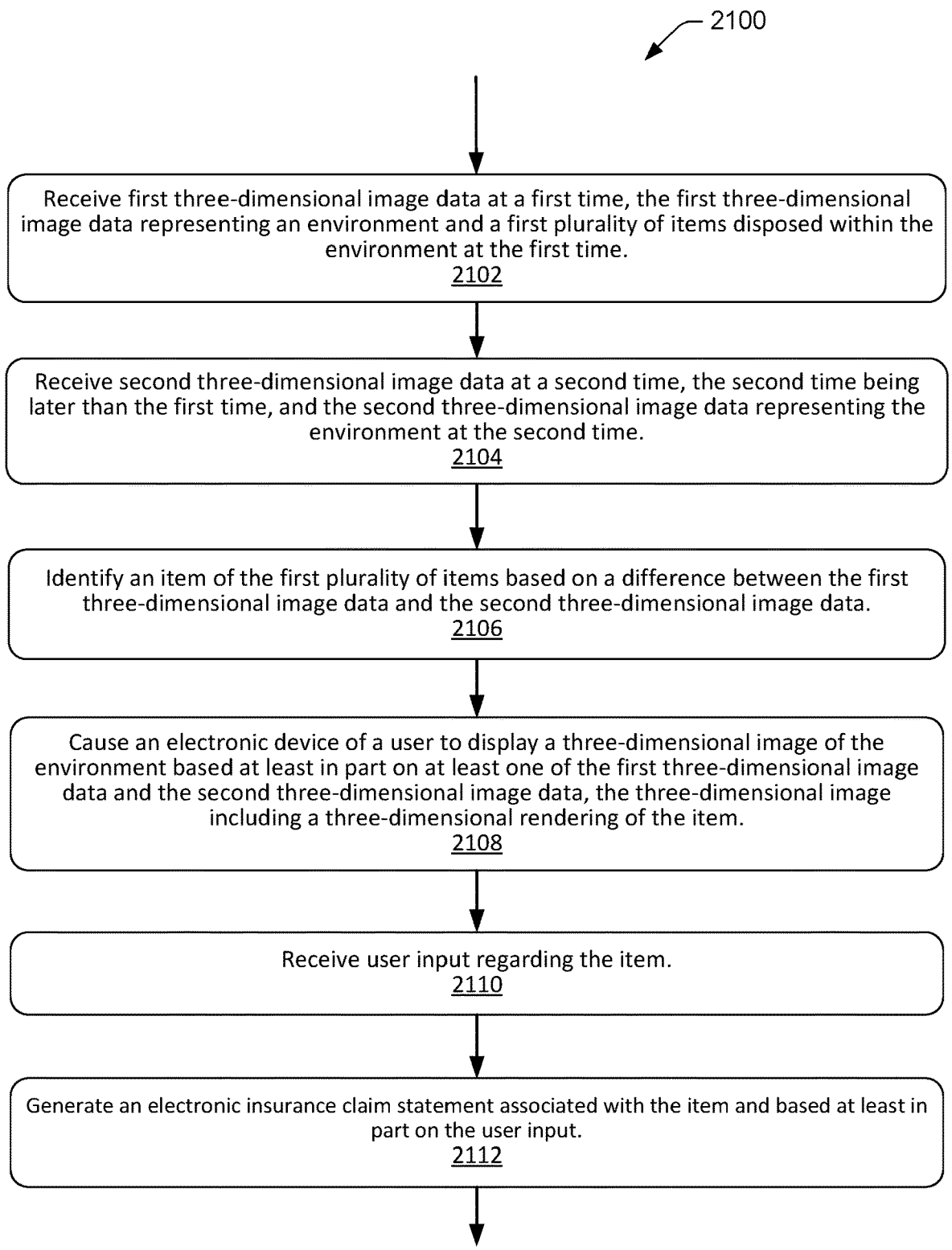
FIG. 21 illustrates a process in which differences to an environment are automatically detected, which assists in generating an electronic insurance claim statement.

FIG. 21 illustrates an example process 2100 using the techniques described herein, in which differences to an environment are automatically detected and one or more items with differences are displayed in a three-dimensional image, to assist in generating an electronic insurance claim statement. At 2102, one or more processors receives first three-dimensional image data at a first time. For example, the first time may be a time prior to an incident such as a theft or weather event. The first three-dimensional image data represents an environment and a first plurality of items disposed within the environment at the first time. At 2104, the one or more processors receives second three-dimensional image data at a second time. The second time is later than the first time and may, for example be a time after the incident such as a theft or weather event. The second three-dimensional image data represents the environment at the second time.

At 2106, the one or more processors identify an item of the first plurality of items based on a difference between the first three-dimensional image data and the second three-dimensional image data. For example, the difference may be as a result of the incident such as theft or weather event. At 2108, the one or more processors causes an electronic device of a user to display a three-dimensional image of the environment based at least in part on at least one of the first three-dimensional image data and the second three-dimensional image data. The three-dimensional image includes a three-dimensional rendering of the item. For example, the electronic device may be the VR/AR/MR rendering device 104.

At 2110, the one or more processors receive user input regarding the item. For example, the user input may be an utterance or a gesture confirming that the item is different at the second time (such as after an incident) from the first time (such as before the incident). At 2112, the one or more processors generate an electronic insurance claim statement associated with the item and based at least in part on the user input.

With the techniques described herein, an inventory of objects in an environment may be more easily and accurately created, such as for use in documenting an insurance claim. Furthermore, changes to objects in an environment may be more accurately determined which may, for example, assist policyholders in preparing and/or documenting an insurance claim after an incident.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving, by a mobile computing device comprising one or more processors, live video data representing a physical environment;
receiving, by the mobile computing device, previous image data representing the physical environment at a previous time;
identifying, by the mobile computing device and based on the live video data, a first physical object associated with a homeowners or property insurance policy;
based on identifying the first physical object associated with the homeowners or property insurance policy, retrieving, from a database, metadata associated with the first physical object;
determining, by the mobile computing device and based on the live video data, the previous image data, the homeowners or property insurance policy, and the retrieved metadata, a requested action to be performed on the first physical object;
providing, by the mobile computing device, a real-time augmented or mixed reality representation of the physical environment, including:
a virtual assistant identifying the first physical object in the physical environment; and
rendering instructions for a user to perform the requested action within the representation at a location proximate to the first physical object or the virtual assistant;
determining, based on the live video data, that the user has performed the requested action on the first physical object;
based on determining that the user has performed the requested action, capturing new image data of a surface of the first physical object exposed by the performing of the requested action; and
generating or updating, by the mobile computing device and based on the new image data, an insurance claim of the homeowners or property insurance policy pertaining to the first physical object.

2. The method of claim 1, further comprising:
receiving a first input comprising at least one of:
receiving and processing a user utterance; or
receiving and interpreting a user body gesture using a gesture interpreter,
wherein the generating or updating the insurance claim of the homeowners or property insurance policy is further based at least in part on the first input.

3. The method of claim 1, wherein identifying the first physical object associated with the homeowners or property insurance policy further comprises:
receiving pupil data representative of a gaze direction of a user relative to the physical environment;
identifying the first physical object based at least in part on the gaze direction; and
verifying that the first physical object is associated with the homeowners or property insurance policy.

4. The method of claim 1, wherein the previous image data representing the physical environment at the previous time comprises point cloud data representing the physical environment.

5. The method of claim 1, wherein providing the real-time augmented or mixed reality representation of the physical environment comprises:
determining a question relating to the first physical object, based at least in part on the live video data and a requirement of the insurance claim; and
presenting the question within the real-time augmented or mixed reality representation of the physical environment, while the virtual assistant is identifying the first physical object in the physical environment.

6. The method of claim 1, wherein identifying the first physical object comprises:
providing the live video data to a trained image recognition machine learning engine; and
identifying the first physical object based at least in part on an output of the trained image recognition machine learning engine.

7. The method of claim 1, wherein identifying the first physical object comprises:
determining an object identifier associated with the first physical object; and
determining the request related to the first physical object, based at least in part on the object identifier.

8. The method of claim 1, further comprising:
automatically determining damage to the first physical object, based at least in part comparing the previous image data and the live video data; and
determining the request related to the first physical object, based at least in part on the determined damage.

9. The method of claim 1, wherein determining the request related to the first physical object comprises:
determining a previous position of an object feature of the first physical object, based on the previous image data; and
comparing the previous position to a current position of the object feature of the first physical object, based on the current image data.

10. The method of claim 1, wherein the request comprises a request that a user perform an action on the first physical object.

11. The method of claim 10, further comprising:
determining that the requested action has been performed on the first physical object; and
obtaining updated current image data, based on the requested action having been performed, the updated current image data including an additional surface of the first physical object.

12. The method of claim 1, wherein:
retrieving the metadata comprises determining a value of the first physical object; and providing the representation comprises rendering the value of the first physical object within the representation.

13. The method of claim 1, wherein:
retrieving the metadata comprises identifying an insurance policy covering the first physical object; and
determining the request related to the first physical object is based on the insurance policy.

14. A system, comprising:
one or more processors; and
memory coupled to the one or more processors, the memory storing instructions executable by the one or more processors to perform operations including:
receiving live video data representing a physical environment;
receiving previous image data representing the physical environment at a previous time;
identifying, based on the live video data, a first physical object associated with a homeowners or property insurance policy;
based on identifying the first physical object associated with the homeowners or property insurance policy, retrieving, from a database, metadata associated with the first physical object;
determining, based on the live video data, the previous image data, the homeowners or property insurance policy, and the retrieved metadata, a requested action to be performed on the first physical object;
providing a real-time augmented or mixed reality representation of the physical environment, including:
a virtual assistant identifying the first physical object in the physical environment; and
rendering instructions for a user to perform the requested action within the representation at a location proximate to the first physical object or the virtual assistant;
determining, based on the live video data, that the user has performed the requested action on the first physical object;
based on determining that the user has performed the requested action, capturing new image data of a surface of the first physical object exposed by the performing of the requested action; and
generating or updating, based on the new image data first input, an insurance claim of the homeowners or property insurance policy pertaining to the first physical object.

15. The system of claim 14, the operations further comprising:
generating, based at least in part on the previous image data, an object list, the object list including an indication of the first physical object.

16. The system of claim 14, the operations further comprising:
identifying, based at least in part on the live video data, a second physical object, wherein the real-time augmented or mixed reality representation of the physical environment includes the second physical object with the virtual assistant providing a second request related to the second physical object; and
receiving, responsive to the second request from the virtual assistant, a second input, wherein the insurance claim includes an indication of the second physical object based at least in part on the second input.

17. The system of claim 14, wherein the virtual assistant is in a shape of a human.

18. The system of claim 14, the operations further comprising:
receiving a first input comprising at least one of:
receiving and processing a user utterance; or
receiving and interpreting a user body gesture using a gesture interpreter,
wherein the generating or updating the insurance claim of the homeowners or property insurance policy is further based at least in part on the first input.

19. A system for generating an insurance claim, comprising:
a means for receiving live video data representing a physical environment;
a means for receiving previous image data representing the physical environment at a previous time;
a means for identifying, based on the live video data, a first physical object associated with a homeowners or property insurance policy;
a means for retrieving, from a database and based on identifying the first physical object associated with the homeowners or property insurance policy, metadata associated with the first physical object;
a means for determining, based on the live video data, the previous image data, the homeowners or property insurance policy, and the retrieved metadata, a requested action to be performed on the first physical object;
a means for providing a real-time augmented or mixed reality representation of the physical environment, including:
a virtual assistant identifying the first physical object in the physical environment; and
rendering instructions for a user to perform the requested action within the representation at a location proximate to the first physical object or the virtual assistant;
a means for determining, based on the live video data, that the user has performed the requested action on the first physical object;
a means for capturing, based on determining that the user has performed the requested action, new image data of a surface of the first physical object exposed by the performing of the requested action; and
a means for generating or updating, based on the new image data, an insurance claim of the homeowners or property insurance policy pertaining to the first physical object.

20. The system of claim 19 for generating an insurance claim, further comprising:
a means for identifying, based at least in part on the live video data, a second physical object, wherein the real-time augmented or mixed reality representation of the physical environment includes the second object with the virtual assistant providing a second request related to the second physical object; and
a means for receiving, responsive to the second request from the virtual assistant, a second input, wherein the insurance claim includes an indication of the second physical object based at least in part on the second input.

* * * * *